US006839617B2

(12) United States Patent
Mensler et al.

(10) Patent No.: US 6,839,617 B2
(45) Date of Patent: Jan. 4, 2005

(54) EXTENSION OF OPERATING RANGE OF FEEDBACK IN CVT RATIO CONTROL

(75) Inventors: Michel Mensler, Kanagawa (JP); Shinichiro Joe, Kanagawa (JP); Taketoshi Kawabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 49 days.

(21) Appl. No.: 10/410,238

(22) Filed: Apr. 10, 2003

(65) Prior Publication Data

US 2003/0195688 A1 Oct. 16, 2003

(30) Foreign Application Priority Data

Apr. 11, 2002 (JP) ....................................... 2002-109163
Aug. 7, 2002 (JP) ....................................... 2002-229593

(51) Int. Cl.[7] ........................... G06F 7/00; G06F 17/00; F16H 61/48

(52) U.S. Cl. ............................ 701/61; 701/51; 477/37; 477/34; 477/46; 477/68; 475/68; 475/198; 307/149; 307/152

(58) Field of Search ....................... 701/61, 51; 477/37, 477/34, 46, 68; 475/198, 207; 307/149, 152

(56) References Cited

U.S. PATENT DOCUMENTS 4,945,483 A * 7/1990 Tokoro ........................ 701/60
4,999,774 A * 3/1991 Tokoro et al. ................ 701/61
5,980,420 A * 11/1999 Sakamoto et al. ............ 476/10
6,272,414 B1 * 8/2001 Takahashi et al. ............ 701/54
6,454,676 B1 * 9/2002 Date et al. ..................... 477/77
2002/0028722 A1 * 3/2002 Sakai et al. ................. 475/214
2002/0161503 A1 10/2002 Joe et al.
2003/0105572 A1 6/2003 Joe et al.

FOREIGN PATENT DOCUMENTS

JP 2000-283285 A 10/2000

* cited by examiner

*Primary Examiner*—Thomas C. Black
*Assistant Examiner*—Olga Hernandez
(74) *Attorney, Agent, or Firm*—Foley & Lardner LLP

(57) ABSTRACT

Operating range of feedback in CVT ratio control has been extended by use of stabilized values as an actual value of CVT ratio. The actual value of CVT ratio is derived from first and second pulse train signals provided by input and output speed sensors. Updating of rotational speed of the input member is repeated at intervals governed by the first pulse train. Updating of rotational speed of the output member is repeated at intervals governed by the second pulse train. Updating of an old value of a ratio between the latest value of the rotational speed of the input member and the latest value of the rotational speed of the output member to a new value thereof is repeated each time immediately after the rotational speeds of the input and output members have been updated since the latest updating of an old value of the ratio.

17 Claims, 16 Drawing Sheets

10
12
14
16
18
20
22
24
26
28
30
32
34
36
38
40
42
44
46
48
50
52
54
56
58
60
62
64
66
68
70
72
74
76
78
80
82
84
86
88
90
92
94
96
98

CVT RATIO

P

I

EXTENSION OF OPERATING RANGE OF FEEDBACK IN CVT RATIO CONTROL

BACKGROUND OF THE INVENTION

1. Field of the Invention

The present invention relates to a method and a system for extension of operating range of feedback in a ratio control in a continuously variable transmission.

2. Description of the Background Art

Continuously variable transmissions (CVT's) are transmissions that change a speed ratio continuously. This continuous nature of CVT's gives them an infinite number of speed ratios, making them very attractive for automotive use.

Various types of CVT are known. One such example is a CVT with pulley/V-belt power transfer. Another example is a CVT with disc/roller power transfer. The CVT of this type is often referred to as a toroidal-type CVT (TCVT) because it transmits torque from one rotating semi-toroidal disc to another semi-toroidal disc by traction rollers through a traction force. The two semi-toroidal discs form a toroidal cavity. In each toroidal cavity, it is preferred to have two traction rollers in equiangularly spaced relationship engaging the discs for transmission of motion therebetween. While three or four traction rollers may be disposed in spaced relationship in each toroidal cavity and will provide increased life for contact surfaces as the total surface area is increased, two traction rollers are preferred for simplicity.

Each traction roller is rotatably supported by a pivot trunnion, respectively. The pivot trunnions, in turn, are supported to pivot about their respective pivot axis. In order to controllably pivot the pivot trunnions for a ratio change, a hydraulic control means is provided. The hydraulic control means is included in a hydraulic cylinder at each pivot trunnion and includes a control volume defined in the hydraulic cylinder between a piston and an axial end of the hydraulic cylinder. The pistons within the hydraulic cylinders are connected to the pivot trunnions along their pivot axis by rods. The piston and its associated rod are thereby rotatable about the pivot axis with the associated pivot trunnion. Variation of the control volume causes the piston to move relative to the hydraulic cylinder, and applies a control force to displace the pivot trunnions. Control forces applied displace the pivot trunnions in the opposite directions along their pivot axis. As a result, the pivot trunnions are caused to pivot about their respective pivot axis, due to the forces present in the rotating toroidal discs, for initiating ratio change.

For terminating the ratio change when a desired ratio has been obtained, a feedback structure is provided. The feedback structure preferably includes a source of hydraulic pressure, and a ratio control valve for controlling the flow of hydraulic fluid for initiating ratio change. The feedback structure further includes a mechanism associated with at least one pivot trunnion to adjust the ratio control valve upon pivotal movement of the pivot trunnion to a desired ratio. The mechanism is preferably a cam connected to a pivot trunnion. The cam may be linked mechanically and/or electronically to operate the ratio control valve upon reaching a desired rotation.

It is known that there is a predetermined operational of the CVT where the CVT ratio has to be maintained at the largest ratio due to difficulty in deriving an actual value of the CVT ratio at very low vehicle speeds. JP-A 2000-283285 discloses a technique to cope with situation. According to this known technique, computation of the CVT ratio is suspended when the period or interval at which the computation is repeated exceeds the period of pulses of pulse train signals provided by input and output rotational speed sensors. In other words, the operating range of feedback in CVT ratio control has been extended until the period or interval at which the computation is repeated exceeds the period of pulses of pulse train signals provided by input and output rotational speed sensors.

A need remains for extending operating range of feedback in ratio control in a CVT for the purpose of reducing the structural margin needed accounting for various causes.

SUMMARY OF THE INVENTION

According to one aspect of the present invention, there is provided a method of deriving an actual value of a ratio between rotational speed of an input member of a continuously variable transmission (CVT) and rotational speed of an output member of the CVT from a first pulse train signal and a second pulse train signal, the first pulse train signal being provided by an input speed sensor of an input speed sensor system including one rotating wheel with the input member, the second pulse train signal being provided by an output speed sensor of an output speed sensor system including another rotating wheel with the output member, the method comprising:

- repeating updating of an old value of rotational speed of the input member to a new value thereof, which results from computation using the pulses of the first pulse train signal, at intervals governed by the first pulse train;
- repeating updating of an old value of rotational speed of the output member to a new value thereof, which results from computation using the pulses of the second pulse train, at intervals governed by the second pulse train; and
- repeating updating of an old value of a ratio between the latest value of the rotational speed of the input member and the latest value of the rotational speed of the output member to a new value thereof each time immediately after the values of the rotational speeds of the input and output members have been updated since the latest updating of an old value of the ratio.

According to another aspect of the present invention, there is provided a method of extending operating range of feedback in ratio control in a continuously variable transmission (CVT) for a motor vehicle, comprising:

- providing a first pulse train signal by an input speed sensor of an input speed sensor system including one rotating wheel with a rotating input member of the CVT;
- providing a second pulse train signal by an output speed sensor of an output speed sensor system including another rotating wheel with a rotating output member of the CVT;
- repeating updating of an old value of rotational speed of the input member to a new value thereof, which results from computation using the pulses of the first pulse train signal, at intervals governed by the first pulse train;
- repeating updating of an old value of rotational speed of the output member to a new value thereof, which results from computation using the pulses of the second pulse train, at intervals governed by the second pulse train;

repeating updating of an old value of a ratio between the latest value of the rotational speed of the input member and the latest value of the rotational speed of the output member to a new value thereof each time immediately after the values of the rotational speeds of the input and output members have been updated since the latest updating of an old value of the ratio; and using the new values of the ratio as an actual value of ratio between rotational speed of the input member of the CVT and rotational speed of the output member of the CVT in conducting a feedback in ratio control in the CVT during a predetermined operational range of the CVT.

BRIEF DESCRIPTION OF THE DRAWINGS

The invention will be apparent from reading of the following description in conjunction with the accompanying drawings.

DESCRIPTION OF THE EMBODIMENTS

Figure 1:
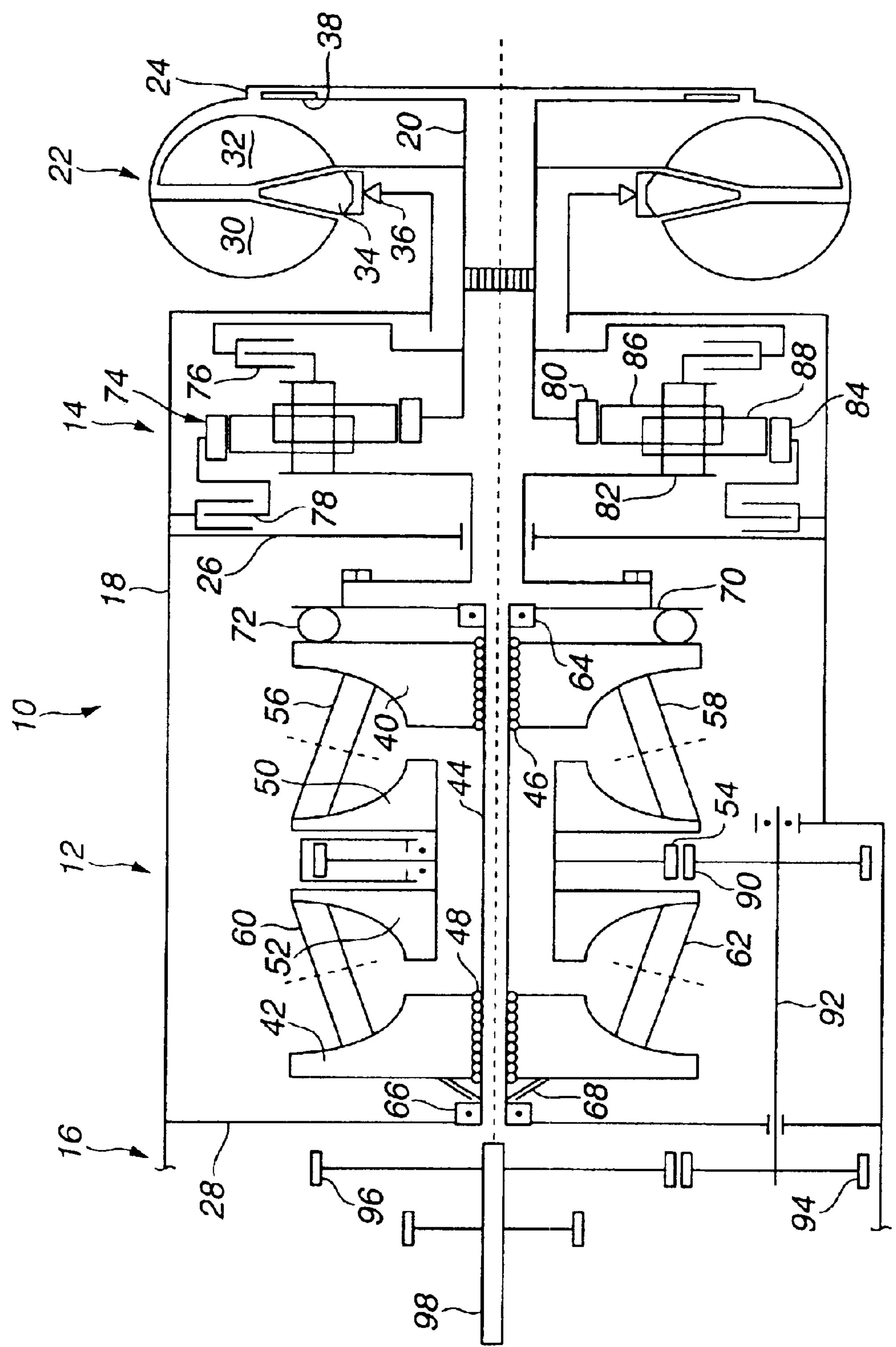
FIG. 1 is a schematic top view of a continuously variable transmission (CVT) including a dual cavity toroidal drive, a planetary drive, and a hydraulic drive.
Figure 2:
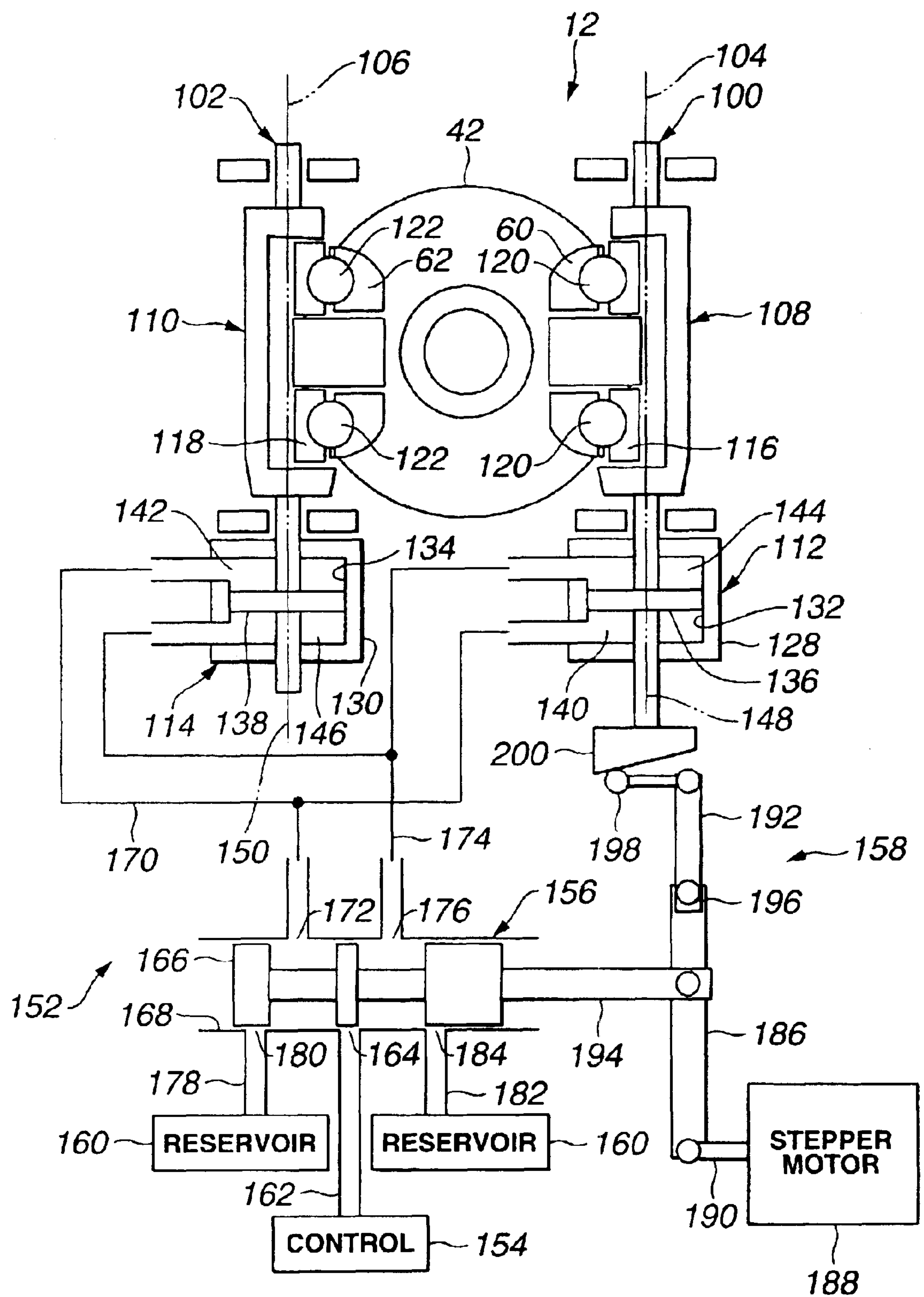
FIG. 2 is a schematic side view of a pair of traction roller assemblies disposed in the rearward cavity of the toroidal drive of FIG. 1 and a schematic representation of a pressure control for a traction drive.

Referring to FIGS. 1 and 2, a CVT 10 includes a dual cavity toroidal drive 12 coaxially connected to a forward positioned input gear section 14 and connected also to a rearward positioned output gear section 16. For purpose of clarification, the terms front or forward refer to the right side, and rear or rearward refer to the left side of the view shown in FIG. 1. All three elements 12, 14 and 16 are enclosed in a housing 18 and driven by an input or turbine shaft 20 that is powered by an engine (not shown) through a torque converter 22 or a lock-up clutch 24. Housing 18 has three chambers, one for each element 12, 14 and 16, separated by walls 26 and 28. Torque converter 22 is a conventional torque converter including a pump impeller 30 connected to the engine, a turbine runner 32 connected to input shaft 20, and a stator 34 grounded via a one-way brake 36. Lock-up clutch 24 is a conventional lock-up clutch including a clutch element 38 connected to input shaft 20.

Dual cavity toroidal drive 12 includes first and second outboard traction discs 40 and 42 mounted on a torque sleeve 44 via ball splines 46 and 48 to rotate in unison. Toroidal drive 12 further includes two inboard traction discs 50 and 52, which are positioned back-to-back and rotatably mounted on sleeve 44, and both coupled to an output gear 54 to rotate in unison. Two inboard traction discs 50 and 52 may be formed as one integral element formed with output gear 54. In this case, the integral element is a dual-faced single disc element rotatably supported by sleeve 44. A toroidal cavity is defined between each outboard discs 40 and 42 and one of the inboard discs 50 and 52. A pair of motion transmitting traction rollers 56, 58, 60 and 62 is disposed in each toroidal cavity, with one roller being disposed transversely on either side of each cavity (see FIGS. 1 and 2). Each pair of traction rollers 56, 58, 60 and 62 is a mirror image of the other pair. Therefore, only the one pair of rollers 60 and 62 is illustrated in FIG. 2. Each pair of traction rollers 56, 58, 60 and 62 are engaged between each outboard discs 40 and 42 and one of the inboard discs 50 and 52 in circles of varying diameters depending on the transmission ratio. Traction rollers 56, 58, 60 and 62 are so supportive that they can be moved to initiate a change in the ratio. That is, each roller 56, 58, 60 and 62 can be actuated to vary its diameter and provide a substantial normal force at their points of contact with the corresponding discs to sufficiently support the traction forces needed to effect the change in ratio. With outboard discs 40 and 42 being rotated continuously by the engine, outboard discs 40 and 42 impinge on traction rollers 56, 58, 60 and 62, causing the traction rollers to rotate. As they rotate, the traction rollers impinge on and rotate inboard discs 50 and 52 in a direction opposite to that of rotating outboard discs 40 and 42. The structure and operation of the other elements of the toroidal drive 12 will be discussed later on in the specification.

With continuing reference to FIG. 1, toroidal drive 12 employs a cam loading system to control normal force between toroidal discs (50, 52, 60, 62) and traction rollers (56, 58, 60, 62). The cam loading system operates on outboard discs 40 and 42 to apply an axial force that is a linear function of the input torque. Describing, in detail, the cam loading system, torque sleeve 44 extends beyond the backs of outboard discs 40 and 42 and has flanges (not shown) at its front and rear ends to carry thrust bearings 64 and 66. The cam loading system includes a disc spring (Belleville spring) 68, which is supported on torque sleeve 44 between thrust bearing 66 and the back of toroidal disc 42 to operate on the disc. The cam loading system also includes a drive plate 70 rotatably supported by torque sleeve 44 via thrust bearing 64. The cam loading system further includes cam rollers 72, which are disposed between drive plate 70 and toroidal disc 40.

Drive plate 70 of the cam loading system is drivingly connected to input shaft 20 through input gear section 14. Input gear section 14 includes a dual-pinion planetary gear system (DPGS) 74, a forward clutch 76, and a reverse brake 78. DPGS 74 includes, in a conventional manner, a sun gear 80, a carrier 82, a ring gear 84, and a plurality of pairs of intermeshed planet pinions 86 and 88 rotatably supported by pins of carrier 82. Pinions 86 and 88 are disposed between sun and ring gears 80 and 84, with inner pinions 86 in engagement with sun gear 80 and outer pinions 88 in engagement with ring gear 84. Sun gear 80 is coupled with input shaft 20 to rotate in unison. Carrier 82 is connected to drive plate 70 of the cam loading system for rotation in unison. Carrier 82 is connectable to input shaft 20 through forward clutch 76. Ring gear 84 is connectable to housing 18 through reverse brake 78.

Input gear section 14 including DPGS 74 functions to establish torque transmission in forward drive mode or reverse drive mode. In the forward drive mode, forward clutch 76 is engaged with reverse brake 78 released. In the reverse drive mode, reverse brake 78 is applied with forward clutch 76 disengaged. In this manner, input torque is applied to drive plate 70 to continuously rotate outboard toroidal discs 40 and 42 in the same direction as that of input shaft 20 in the forward drive mode, but in a direction opposite to that of input shaft 20 in the reverse drive mode. The input torque is transmitted from outboard discs 40 and 42 to inboard discs 50 and 52 to rotate output gear 54.

Output gear section 16 including an input gear 90 of a counter shaft 92 functions to provide torque transmission from output gear 54. Output gear 54 is in engagement with input gear 90 of counter shaft 92, which has an output gear 94. Output gear section 16 also includes a gear 96 of an output shaft 98. Output gear section 16 may include an idler gear (not shown) between output gear 94 and gear 96. Rotation of inboard toroidal discs 50 and 52 is transmitted via output gear 54, gear 90, counter shaft 92, gear 94 and gear 96 to output shaft 98.

Referring to FIG. 2, toroidal drive 12 in this embodiment includes two traction rollers 60, 62 in each toroidal cavity. Each of the rollers 60, 62 is rotatably supported by a pivot trunnion 100, 102, respectively. Pivot trunnions 100, 102, in turn, are supported to pivot about their respective pivot axis 104, 106. Each of traction rollers 60, 62 and the corresponding pivot trunnion 100, 102 are components of traction roller assemblies 108, 110.

As is well known to those skilled in the art, the surfaces of toroidal discs 40, 42, 50, 52 defining cavities have a radius of curvature, the origin of which coincides with the pivot axis 104, 106. This geometry permits the pivot trunnions and traction rollers to pivot and maintain contact with the surfaces of the toroidal discs.

Traction roller assemblies 108, 110 each also include a hydraulic piston assembly 112, 114 in addition to the pivot trunnion 100, 102. Pivot trunnions 100, 102 each have a backing plate 116, 118 that supports traction roller 60, 62 rotatably. Bearings 120, 122, positioned between plate 116, 118 and traction roller 60, 62, permit relative rotation between backing plate 116, 118 and traction roller 60, 62. Backing plates 116, 118 each have an extension 124, 126 that supports traction roller 60, 62, on a bearing not shown, for rotation.

Hydraulic piston assembly 112, 114 includes a housing 128, 130 enclosing a cylinder 132, 134 in which is slidably disposed a piston and rod 136, 138. Piston and rod 136, 138 divides cylinder 132, 134 into equal area chambers including a first chamber 140, 142 and a second chamber 144, 146. Piston and rod 136, 138 is disposed so that its centerline 148, 150 is disposed substantially along pivot axis 104, 106, respectively. So positioned, piston and rod 136, 138 is able to pivot about pivot axis 104, 106 with pivot trunnion 100, 102, respectively.

The pressure in first and second chambers 140, 142; 144, 146 are established by a hydraulic control system 152. Hydraulic control system 152 includes a pump, not shown, an electro-hydraulic control 154, a ratio control valve 156, and a feedback structure 158. The pump is a conventional pump that draws hydraulic fluid from a reservoir 160 and delivers the fluid to electro-hydraulic control 154 from which the fluid is delivered to ratio control valve 156.

Control 154 delivers system (or line) pressure Pl to a passage 162 that is connected to an inlet port 164 of ratio control valve 156. Ratio control valve 156 has a spool 166 slidably disposed in a valve bore 168. Valve bore 168 is in fluid communication with passage 162 via inlet port 164. Valve bore 168 is also in fluid communication with a first control passage 170 via a first control port 172, and with a second control passage 174 via a second control port 176. Valve bore 168 is further in fluid communication with a first drain passage 178 via a first drain port 180, and with a second drain passage 182 via a second drain port 184.

Spool 166 is connected to a feedback lever 186, which is a component of feedback structure 158. A ratio actuator 188, in the form of a stepper motor, for example, receives a control signal. The control signal is an actuator command, which will be described later. In response to the control signal, the stepper motor 188 moves feedback lever 186, connected to an actuator shaft 190, to initiate the ratio change in toroidal drive 12. Feedback lever 186 is connected to actuator shaft 190 at one end and to a bell crank 192 at the other end. At a point between the two ends, the feedback lever 186 is pivotally connected to a spool rod 194, which is connected to spool 166 to move in unison. Bell crank 192 has one end 196 pivotally connected to the other end of feedback lever 186 and the other end 198. The other end 198 of bell crank 192 is controlled by the angular position about pivot axis 104 of traction roller assembly 108 through contact with a precess cam 200 formed on piston and rod 136. As the stepper motor 188 moves feedback lever 186, valve 156 alters, in response to movement of valve rod 194, the hydraulic pressure in lines 170 and 174. Hydraulic pressure is provided to the valve 156 through line 162, which is supplied with system or line pressure. As the pressure in lines 170 and 174 is altered, traction roller assemblies 108 and 110 move along pivot axis 104 and 106 in the opposite directions and then pivot about pivot axis 104 and 106, changing the ratio in toroidal drive 12. As traction roller assembly 108 pivots, lever 186 moves, due to rotation of cam 200 and movement of bell crank 192, repositioning valve rod 194, providing means for valve 156 to reinstate the pressure in lines 170 and 174 to stop traction roller assemblies 108 and 110 from pivoting.

The stepper motor 188 controls displacement of actuator shaft 190, which, in turn, controls the ratio in toroidal drive 12. Adjusting the angular displacement of stepper motor 188 controls the ratio in toroidal drive 12.

In the embodiment shown in FIG. 1, the outboard discs 40 and 42 may be called input discs, respectively. The inboard discs 50 and 52 may be called output discs, respectively.

Figure 3:
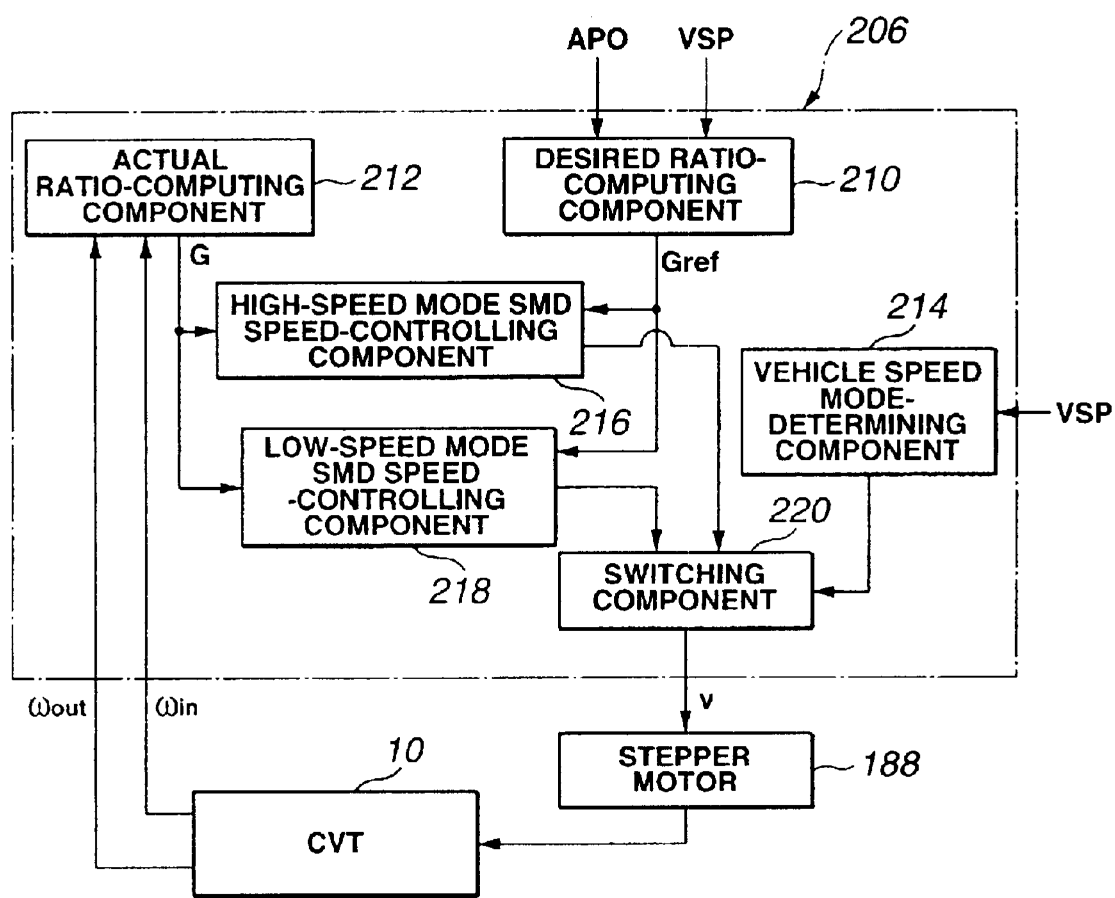
FIG. 3 is a block diagram showing the relationship between a CVT controller, a stepper motor and a toroidal-type CVT.

With reference to FIG. 3, a CVT controller 206 is illustrated in association with the stepper motor 188 and the CVT 10. The CVT controller 206 determines and applies an actuator command to the stepper motor 188. In one exemplary implementation of the present invention, the CVT controller 300 determines motor steps rate v and generates, as the actuator command, the determined motor steps rate v. Apparently, the motor steps rate v corresponds to a driving speed of the stepper motor 188. Throughout the specification, the determined motor steps rate is called "a stepper motor driving (SMD) speed v." In response to the SMD speed v, a value $\phi$ of trunnion angular position within the CVT 10 varies. Throughout the specification, the value $\phi$ of trunnion angular position is called "a roller inclination angle $\phi$."

(Stepper Motor & TCVT)

Figure 4:
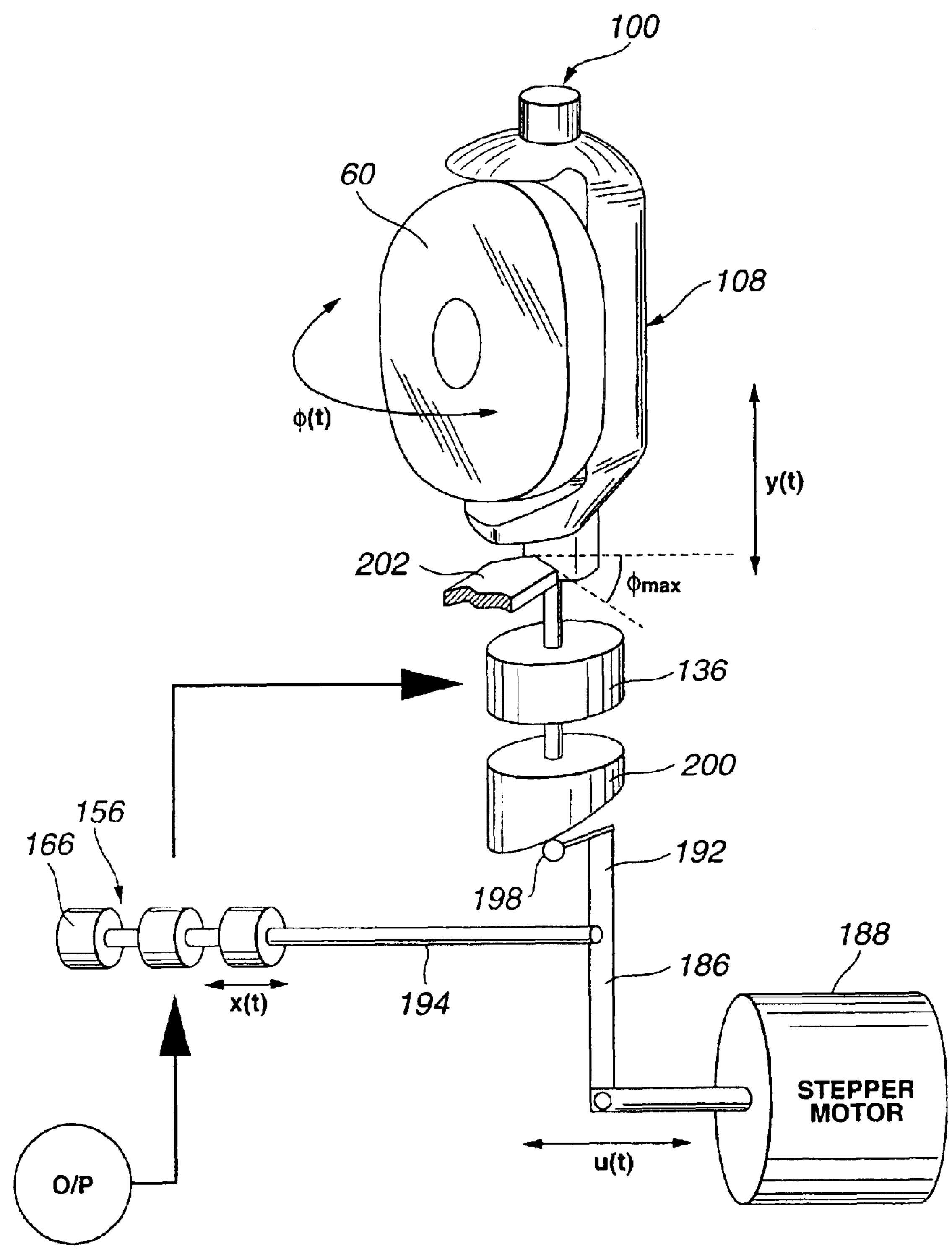
FIG. 4 is a perspective schematic diagram illustrating the relationship between a traction roller assembly including a traction (or power) roller and a hydraulic piston, a ratio control valve, a stepper motor, and a feedback structure including a precess cam and a feedback lever.

In FIG. 3, the stepper motor 188 functions to integrate the SMD speed v with respect to time to yield a stepper motor driving (SMD) position u. The number of steps governs the displacement within the stepper motor 188. In this example, the displacement is proportional to the number of steps. FIG. 4 is a fragmentary perspective view illustrating the trunnion assembly 108 including an inclination stop 202. The inclination stop 202 defines the maximum angle $\phi_{max}$ of the pivot trunnion 100. FIG. 4 illustrates the relationship between the displacement x(t) of the spool 166, the SMD position u(t), the axial displacement y(t) of the trunnion 100, and the roller inclination angle $\phi$(t).

The CVT ratio of the CVT 10 is a ratio G between the speed $\omega_{in}$ of the input disc and the speed $\omega_{out}$ of the output disc ($G=\omega_{in}/\omega_{out}$). The CVT ratio G may be expressed as, $$G(t)=\frac{\omega_{\text{in}}}{\omega_{out}}=\frac{1+\eta-2\cos(2\theta-\phi)}{1+\eta-\cos\phi} \tag{1}$$

where: $\eta$ and $\theta$ are quantities that are determined according to mechanical specification of the CVT 10.

The roller inclination angle $\phi$ is necessary for ratio control of the CVT 10. However, it is difficult to measure so that the above equation (1) is used. Substituting the CVT ratio G into the equation (1) yields the roller inclination angle $\phi$. For computing the CVT ratio G, speed sensors are used to detect the speed $\omega_{in}$ of the input disc and the speed $\omega_{out}$ of the output disc. The speed sensors include toothed wheels rotatable with the output and input discs, respectively. The structure of the speed sensors will be described later.

The SMD speed v and SMD position u hold the relationship as, $$\frac{du}{dt}=v \tag{2}$$

Varying of the inclination angle $\phi$ with different values of the SMD position u may be expressed as, $$\begin{cases}\frac{dx}{dt}=Ax+Bv\\ y=Cx\end{cases} \tag{3}$$

In the above equations, the notations A, B, C and x are:

$$A=\begin{bmatrix}0 & h\omega_{out} & 0\\ -a_1 & -a_2 & bg\\ 0 & 0 & 0\end{bmatrix}$$

$$B=\begin{bmatrix}0\\0\\1\end{bmatrix}$$

$$C=[1\ \ 0\ \ 0]$$

$$X=\begin{bmatrix}\phi\\ y\\ u\end{bmatrix}$$

where:

$a_1$ is the constant determined by the precess cam 200 and the link ratio between the links 186 and 192 accounting for feedback of the angular displacement of the precess cam 200 to the spool 166;

$a_2$ is the constant determined by the precess cam 200 and the link ratio between the links 186 and 192 accounting for feedback of the axial displacement of the trunnion 100 to the spool 166;

b is the constant determined by the link ratio and the lead of screw of the stepper motor 188;

g is the gain of the valve 156; and h is expressed as, $$h=\frac{\cos(\theta-\phi)[1+\eta-\cos(2\theta-\phi)]}{(1+\eta)R_0\sin\theta} \tag{4}$$

Notations:

$\theta$, $\eta$ and $R_0$ are constants determined by the structure of the CVT 10.

It is understood from the above explanation that the roller inclination angle $\phi$ and the speed $\omega_{out}$ of the output disc at a given moment determine the rate at which the roller inclines per unit amount of time.

(CVT Ratio Controller)

The block diagram in FIG. 3 illustrates the CVT ratio controller 206. Accelerator pedal opening APO and vehicle speed VSP are used as inputs of the CVT ratio controller 206. The speed $\omega_{out}$ of output disc and the speed $\omega_{in}$ of input disc are used as other inputs of the CVT ratio controller 206. The CVT ratio controller 206 generates the SMD speed v as the actuator demand for the stepper motor 188.

The CVT ratio controller 206 includes a desired ratio-computing (DRC) component 210 and an actual ratio-computing (ARC) component 212. The CVT ratio controller 206 also includes a vehicle speed mode-determining (VSMD) component 214, a high-speed mode SMD speed-controlling (HSMSMDSC) component 216, a low-speed mode SMD speed-controlling (LSMSMDSC) component 218, and a switching component 220. Briefly, the DRC component 210 computes a desired value Gref of CVT ratio from the accelerator opening APO and vehicle speed VSP. The ARC component 212 computes an actual value G of CVT ratio. The HSMSMDSC component 216 computes a high-speed mode value $v_H$ of SMDS command in a high-speed mode. The LSMSMDSC component 218 computes a low-speed mode value $v_L$ of SMDS command in a low-speed mode.

The HSMSMDSC component 216 is a time-driven control and carries out a PID control using the CVT model mathematically expressed by the equations (1) to (4) to determine the high-speed mode value $v_H$ of SMDS command to track the desired value of CVT ratio Gref. The form of the actuator command is not limited to SMDS command. Number of motor steps may be used as the actuator command.

The LSMSMDSC component 218 is an event-driven control and carries out a PI control using the CVT model mathematically expressed by the equations (1) to (4). In the above-mentioned HSMSMDSC component 216, the CVT ratio is regulated based on a function involving time as a variable. As compared to it, the LSMSMDSC component 218 uses a function involving as a variable angular displacement of a rotational speed sensor in regulating the CVT ratio. Thus, even if the vehicle speed changes during operation in low vehicle speed mode, the LSMSMDSC component 218 can give stabilized CVT ratio. With the PI control, the number of steps u is output, as the actuator command applied to the stepper motor 188.

In response to an output of the VSMD component 214, the switching component 63 selects the high-speed mode value $v_H$ of SMDS command from the HSMSMDSC component 216 upon determination of high-speed mode and it selects the low-speed mode value $v_L$ of SMDS command from the LSMSMDSC component 218.

Figure 6:
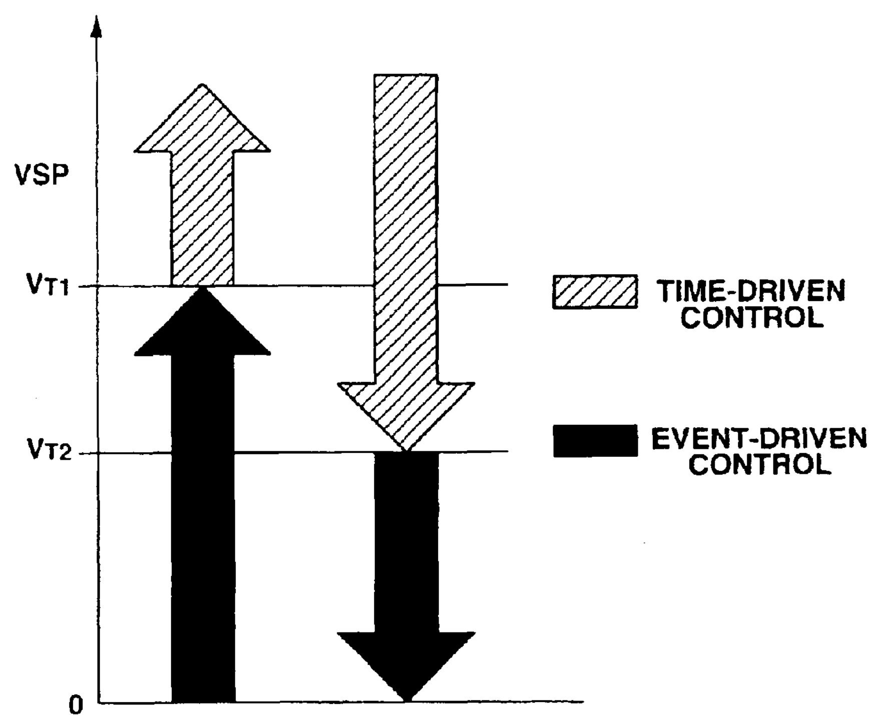
FIG. 6 is a view illustrating hysteresis between selection of control mode and vehicle speed.

An input to the VSMD component 214 is the vehicle speed VSP. As illustrated in FIG. 6, in the VSMD component 214, when vehicle speed VSP is increasing, the vehicle speed VSP is compared to an upper threshold $V_{T1}$, while, when the vehicle speed VSP is decreasing, the vehicle speed VSP is compared to a lower threshold $V_{T2}$ ($V_{T2}<V_{T1}$). The provision of two thresholds is to prevent control hunting. The output of the VSMD component 214 may be a two-level signal. Its one level is indicative of time-driven control in high vehicle speed mode, and the other level is indicative of event-driven control in low vehicle speed mode.

Figure 5:
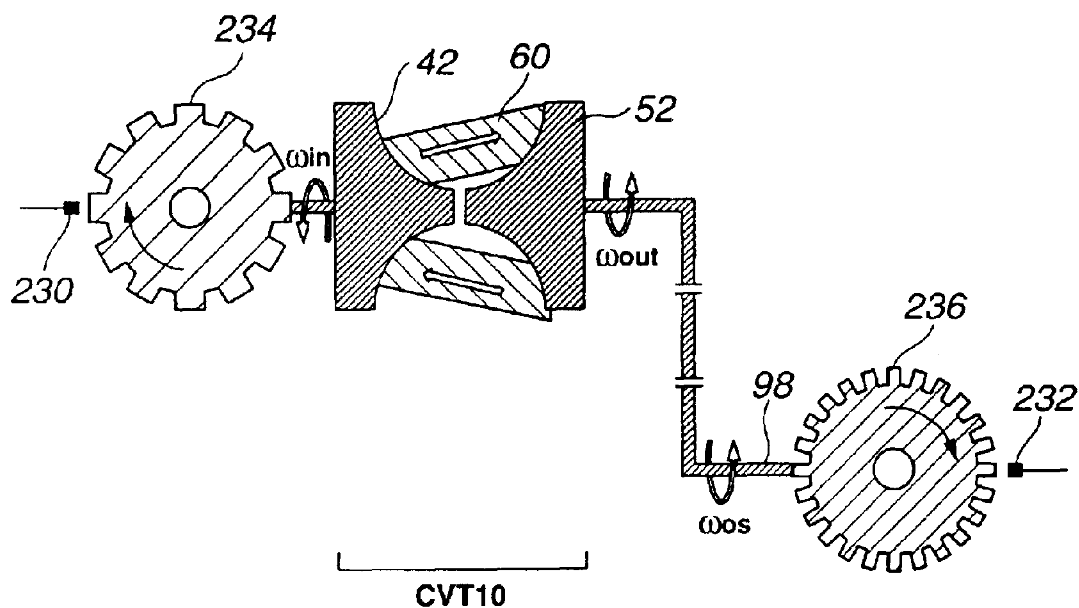
FIG. 5 is a schematic diagram illustrating the relationship between input and output discs of the CVT and input and output speed sensors for detecting rotational speeds of the input and output discs, respectively.

With reference to FIG. 5, the ARC component 212 computes speed of an input disc 42, for example, based on a pulse train generated by an input rotational speed sensor 230. It also computes speed of output disc 52, for example, based on a pulse train signal generated by an output rotational speed sensor 232. FIG. 5 is a model of the input and output rotational speed sensors 230 and 232. For rotational speed sensing, a toothed wheel 234 is rotational with the input disc 42, and the input rotational speed sensor 230 is responsive to the passage of teeth of the toothed wheel 234 through an area in its proximity. The input rotational speed sensor 230 generates a pulse in timed with the passage of one tooth. Another toothed wheel 236 is rotational with the output shaft 98. A reduction gearing interconnects the output shaft 98 and the output disc 52. The reduction gearing has a reduction ratio $i_e$. The output rotational speed sensor 232 is responsive to the passage of teeth of the toothed wheel 236 through an area in its proximity. The output rotational speed sensor 232 generates a pulse in timed with the passage of one tooth. The ARC component 212 counts per unit amount of time the number of pulses of the pulse train signal generated by the input rotational speed sensor 230 and sets the result as the rotational speed $\omega_{in}$ of the input disc 42. The pulse train signal generated by the output speed sensor 232 is fed to the ARC component 22. The ARC component 222 counts per unit amount of time the number of pulses and sets the result as the rotational speed $\omega_{os}$ of the output shaft 98. The ARC component 222 computes the rotational speed $\omega_{out}$ of the output disc 52 based on the rotational speed $\omega_{os}$ and the reduction ratio $I_e$.

Figure 7:
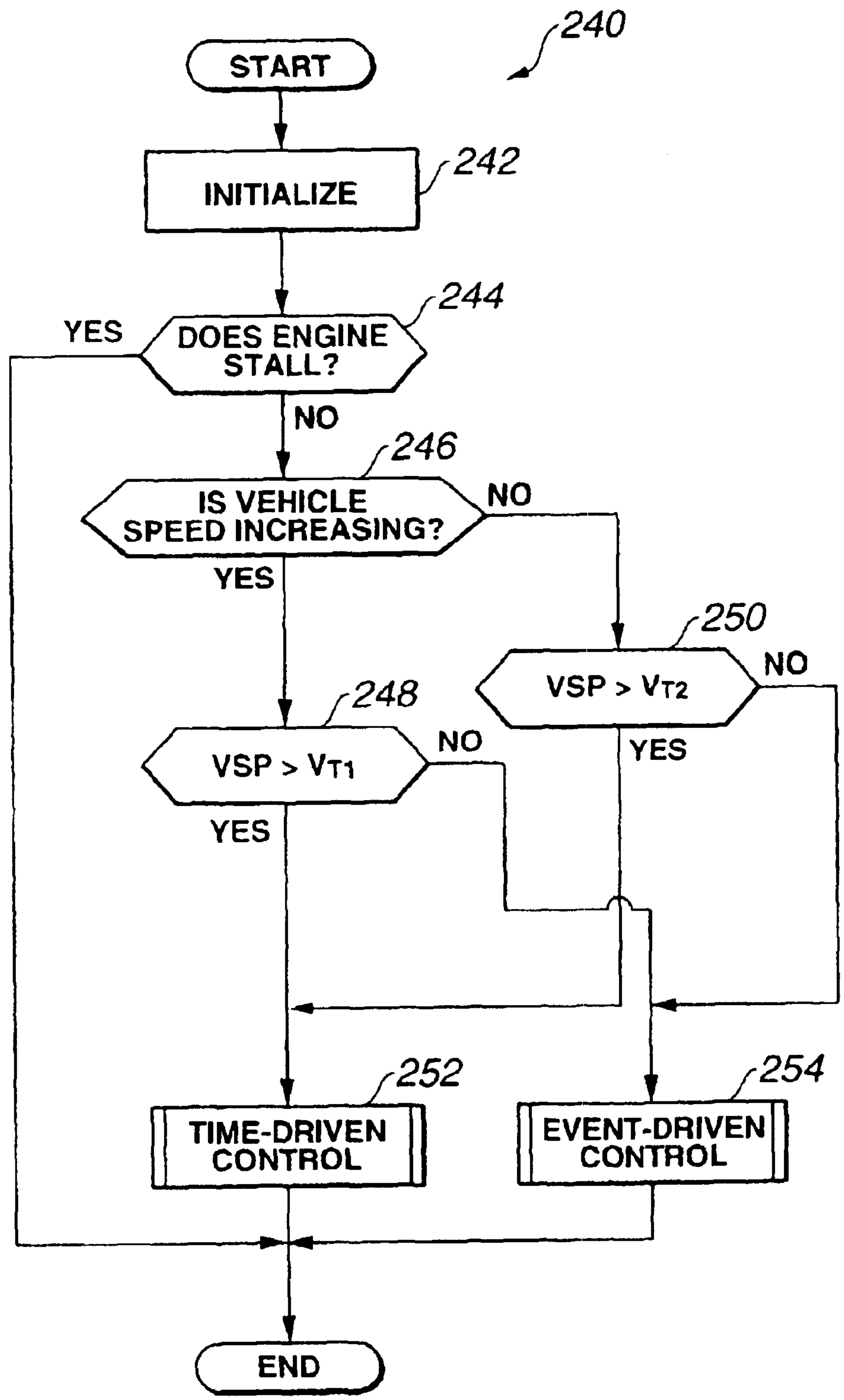
FIG. 7 is a flow diagram of a control routine implementing the present invention.

The flow diagram in FIG. 7 illustrates a control routine 240 of ratio control within the ratio controller 206.

In box 242, the controller 206 carries out initialization.

In the next box 244, the controller 206 determines whether or not the engine stalls. If this is the case, the routine ends. If this is not the case, the control logic goes to box 246.

In box 246, the controller 206 determines whether or not the vehicle speed VSP is increasing. If this is the case, the control logic goes to box 248. If this is not the case, the control logic goes to box 250.

In box 248, the controller 206 determines whether or not vehicle speed VSP is greater than an upper threshold $V_{T1}$. If this is the case, the control logic goes to box 252. If this is not the case, the control logic goes to box 254.

In box 250, the controller 206 determines whether or not vehicle speed VSP is greater than a lower threshold $V_{T2}$. If this is the case, the control logic goes to box 252. If this is not the case, the control logic goes to box 254.

In box 252, the controller 206 carries out time-driven control. In the illustrated implementation, the controller 206 carries out, as the time-driven control, PI control.

In box 254, the controller 206 carries out event-driven control. In the illustrated implementation, the controller 206 carries out, as the event-driven control, PI control.

Figure 8A:
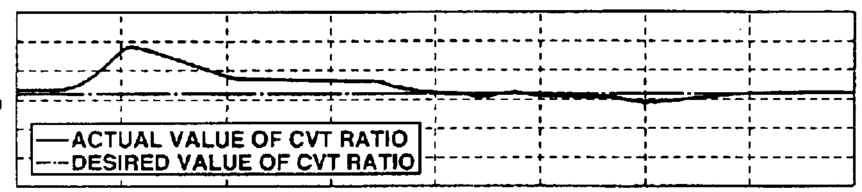
FIGS. 8A, 8B and 8C are timing diagrams during CVT ratio control at low vehicle speeds
Figure 8B:
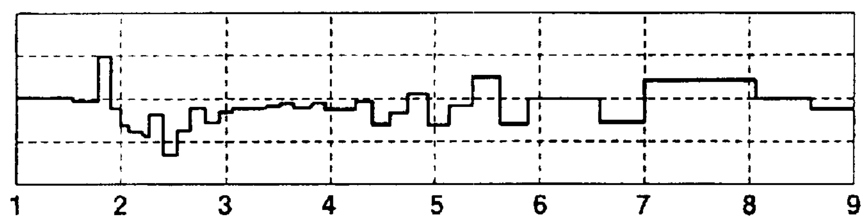
Figure 8C:
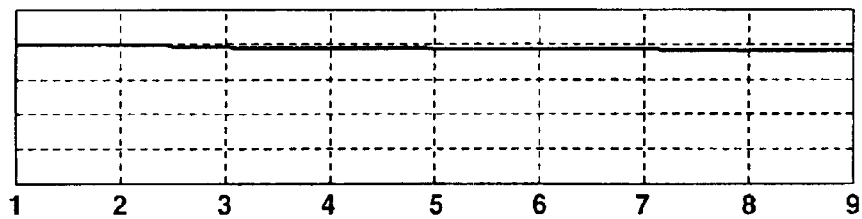

The time charts in FIGS. 8A, 8B and 8C illustrate the result of simulation. FIG. 8A illustrates varying of actual value of CVT ratio with time and varying of desired value of CVT ratio with time. FIG. 8B illustrates varying of proportional (P) element with time. FIG. 8C illustrates varying of integral (I) element with time. The timing charts clearly show that employing the event-driven PI control in timed with period or interval of pulses of the pulse train signal has stabilized CVT ratio control.

According to the exemplary implementation of the present invention, the LSMSMDSC component 218 determines the number of steps u and applies the determined number of steps u to the switching component 220.

The equations (1) to (4) express the mathematical model, with respect to time, of the CVT 10. We now consider replacing this mathematical model with a mathematical model with respect to the angular position of the output speed sensor 232 (see FIG. 5).

With reference back to FIG. 5, the output speed sensor 232 and the output disc 52 hold the relationship as, $$\sigma out = ie\sigma os \quad (5)$$

where:

$\sigma_{out}$ is the rotational angle of the output disc 52, and $\sigma_{os}$ is the rotational angle of the toothed wheel 236 of output speed sensor 232.

Differentiating the above equation (5) with time yields $$\frac{d\sigma_{out}}{dt} = i_e \frac{d\sigma_{os}}{dt} \quad (6)$$

Since the degrees of the rotational angle per unit amount of time corresponds to the speed $\omega_{out}$ of the output disc 52, the relation may be expressed as, $$\frac{d\sigma_{out}}{dt} = \omega_{out} \quad (7)$$

From the equations (6) and (7), we obtain $$\frac{1}{dt} = \omega_{out} \frac{1}{i_e} \frac{1}{d\sigma_{os}} \quad (8)$$

Rewriting the equation (3), we obtain equations (9), (10) and (11), $$\frac{d\phi}{dt} = h\,\omega_{out} y \quad (9)$$

$$\frac{dy}{dt} = -a_1 g\phi - a_2 gy + bgu \quad (10)$$

$$\frac{du}{dt} = v \quad (11)$$

Substituting the equation (8) into the equation (9) yields, $$\frac{d\phi}{dt} = \frac{d\phi}{d\sigma_{os}} \omega_{out} \frac{1}{i_e} = h\,\omega_{out} y \quad (12)$$

Rewriting the equation (12) yields, $$\frac{d\phi}{d\sigma_{os}} = hi_e y \quad (13)$$

Substituting the equation (8) into the equation (10) yields, $$\frac{dy}{d\sigma_{os}} = \frac{i_e}{\omega_{out}}(-a_1 g\phi - a_2 gy + bgu) \quad (14)$$

Differentiating the equation (13) with respect to $\sigma_{os}$ yields $$\frac{d^2\phi}{d\sigma_{os}^2} = hi_e \frac{dy}{d\sigma_{os}} \quad (15)$$

Substituting the equations (14) and (13) into the equation (15) yields $$\omega_{out} \frac{d^2\phi}{d\sigma_{os}^2} + (i_e a_2 g)\frac{d\phi}{d\sigma_{os}} + (i_e^2 ha_1 g)\phi = i_e^2 hbgu \quad (16)$$

Here, we find Laplace transform of $x(\sigma_{os})$ $$L\{x(\sigma os)\} = X(S) = \int_0^\infty x(\sigma os) e^{-s\sigma_{os}} d\sigma os \quad (17)$$

Thus, it leads the equation (16) to $$\{\omega outs\mathbf{2} + (ie a\mathbf{2} g)s + (ie\mathbf{2} ha\mathbf{1} g)\}\Phi(s) = (i_e^{2} hbg)U(s) \quad (18)$$

Accordingly, $$\frac{\Phi(s)}{U(s)} = \frac{(i_e^2 hbg)}{\omega_{out} S^2 + (i_e a_2 g)s + (i_e^2 ha_1 g)} \quad (19)$$

In the preceding description, we considered a continuous-value model treating the value $\sigma_{os}$ as continuous. However, the actual value of the output of sensor is discrete. Using Tustin approximation, we can convert the continuous-value model to a discrete-value model based on a discrete value $\xi$.

Figure 9:
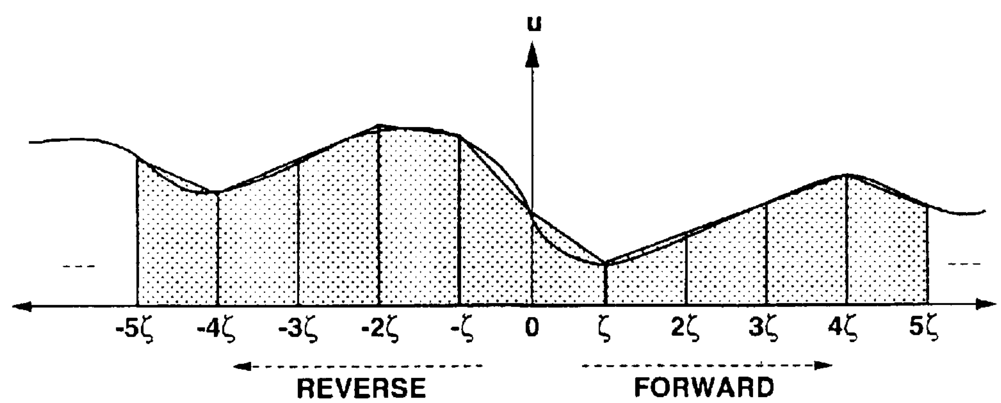
FIG. 9 is a view illustrating a Tustin approximation.

In the case of a continuous-time model, it is not necessary to consider minus (−) values in time. In the case of a model based on a rotational angle, it is necessary to consider minus discrete values for reverse and plus discrete values for forward as shown in FIG. 9. A difference equation may be expressed as, $$\phi(k+1) = \phi(k) + \frac{\delta\zeta}{2}[u(k) + u(k+1)] \quad (20)$$

where:

$$\delta \text{ is a function} \begin{cases} \delta = +1 \ \ldots \text{ for forward} \\ \delta = -1 \ \ldots \text{ for reverse} \end{cases}$$

Using z transform as $$z = e^{s\delta\xi} \quad (21)$$

yields $$S = \frac{1}{\delta\zeta} \ln z \quad (22)$$

to give series as $$S = \frac{2}{\delta\zeta}\left\{\frac{z-1}{z+1} + \frac{1}{3}\left(\frac{z-1}{z+1}\right)^3 + \ldots\right\} \quad (23)$$

Approximating s with the first order term, we obtain $$S = \frac{2}{\delta\zeta}\left(\frac{z-1}{z+1}\right) \quad (24)$$

Substituting this equation (24) into the equation (19) yields $$\frac{\Phi(z)}{U(z)} = \frac{\beta(z+1)}{\alpha_2 Z^2 + \alpha_1 Z + \alpha_0} \quad (25)$$

$$\begin{cases} \beta = bgh\, i_e^2 \zeta^2 \\ \alpha_2 = 4\omega_{out} + a_1 ghi_e^2 \zeta^2 + \delta 2 a_2 gi_e \zeta \\ \alpha_1 = -8\omega_{out} + 2a_1 ghi_e^2 \zeta^2 \\ \alpha_0 = 4\omega_{out} + a_1 ghi_e^2 \zeta^2 - \delta 2 a_2 gi_e \zeta \end{cases}$$

At low speed, we may assume that $\omega_{out} \approx 0$ because the speed of output disc $\omega_{out}$ is almost 0. Thus, the equation (25) may be simplified as $$\frac{\Phi(z)}{U(z)} = \frac{\delta bhi_e\zeta(z+1)}{(2\alpha_2+\delta\alpha_1 i_e h\delta)Z+(-2\alpha_2+\delta\alpha_1 i_e h\delta)} \quad (26)$$

This relationship expressed by the equation (26) is used to compute the number of steps u for the subsequent output as the actuator command applied to the stepper motor 188.

Figure 10:
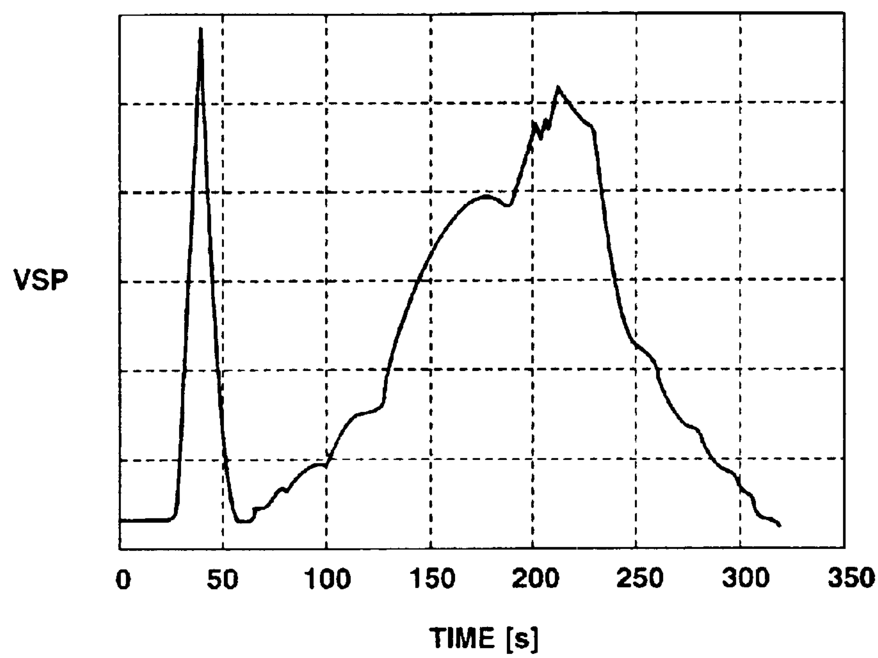
FIG. 10 is a graph illustrating varying of vehicle speed with time during simulation at low vehicle speeds.
Figure 11:
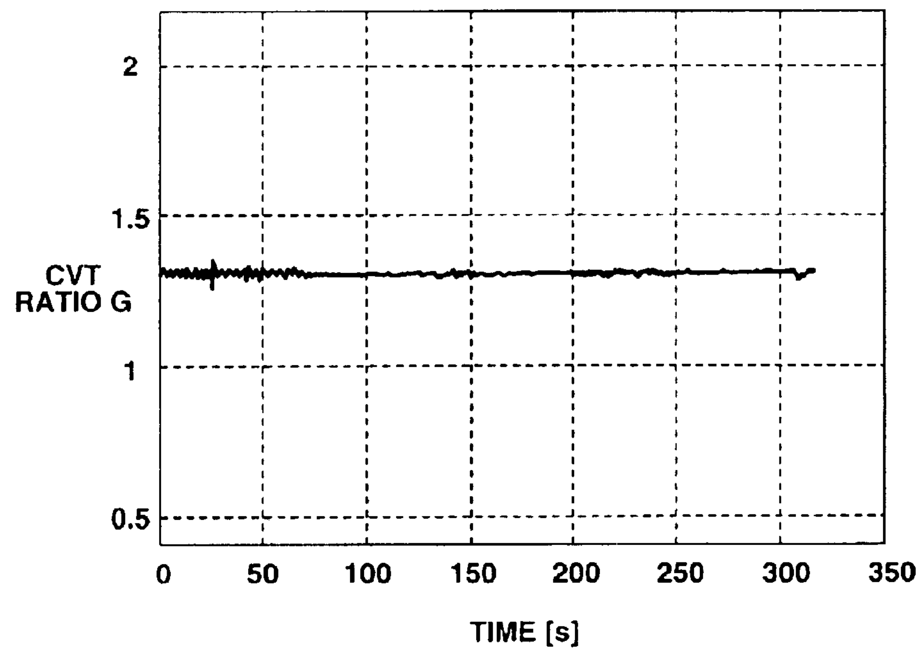
FIG. 11 is a graph illustrating varying of CVT ratio with time during the simulation.
Figure 12:
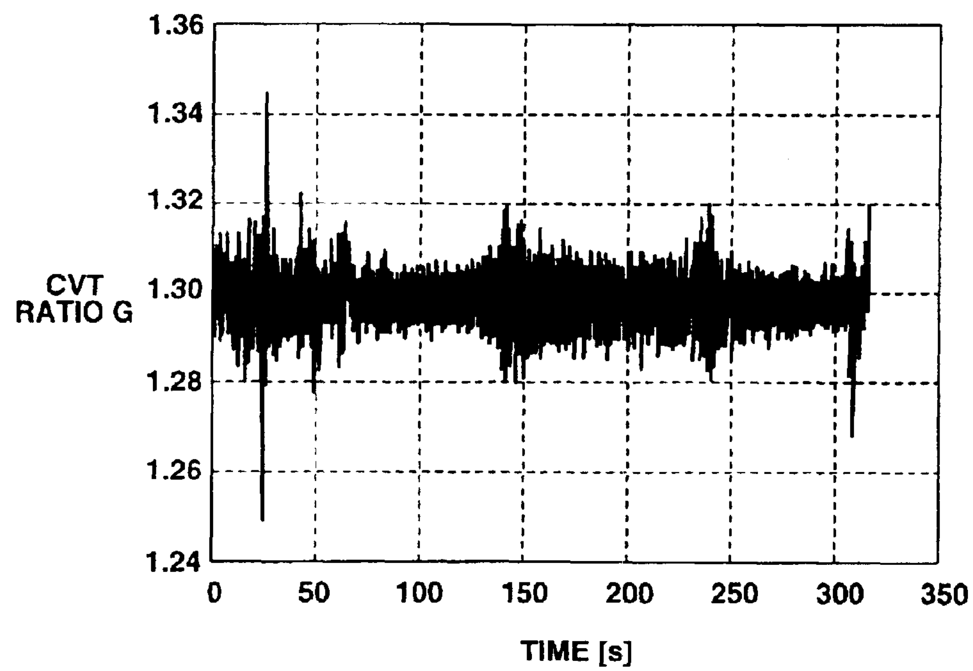
FIG. 12 is a magnified view of FIG. 11.
Figure 13:
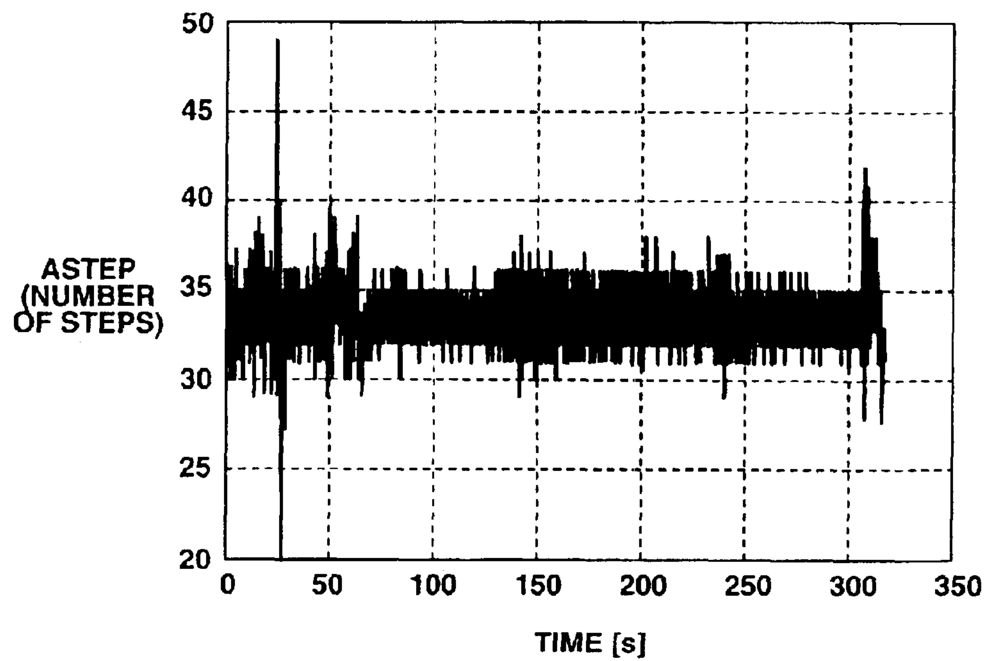
FIG. 13 is a graph illustrating varying of number of steps with time during the simulation.

The timing diagrams in FIGS. 10 to 13 illustrate result of simulation of a ratio controller equipped with the LSMSMDSC component 218. FIG. 10 shows varying of vehicle speed VSP with time. FIG. 11 shows varying of CVT ratio with time. FIG. 12 is a magnified view of FIG. 11. FIG. 13 shows varying of number of steps with time. FIG. 12 clearly tells that variations in CVT ratio and number of steps are suppressed sufficiently against variation in vehicle speed at low vehicle speeds as shown in FIG. 10. FIG. 13 clearly tells that number of steps to be applied, as the actuator command, to the stepper motor 188 is very small.

From the preceding description, it is understood that computation of the CVT ratio is stabilized event at low vehicle speeds, extending the operating range of feedback control toward low vehicle speeds.

In the preceding implementation of the present invention, the PI controller is used to compute the number of steps to be applied as actuator command to the stepper motor 188. As an alternative embodiment, a PID controller using digital values from the rotational speed sensor as a variable may be derived from the equation (26) and expressed as $$C(z) = K_P + K_I\delta\zeta\frac{z}{z-1} + \frac{K_D}{\delta\zeta}\frac{z-1}{z} \quad (27)$$

where:

$K_P$, $K_I$ and $K_D$ are proportional, integral and differential gains, respectively.

With this control, stabilized CVT ratio control may be accomplished.

Figure 14:
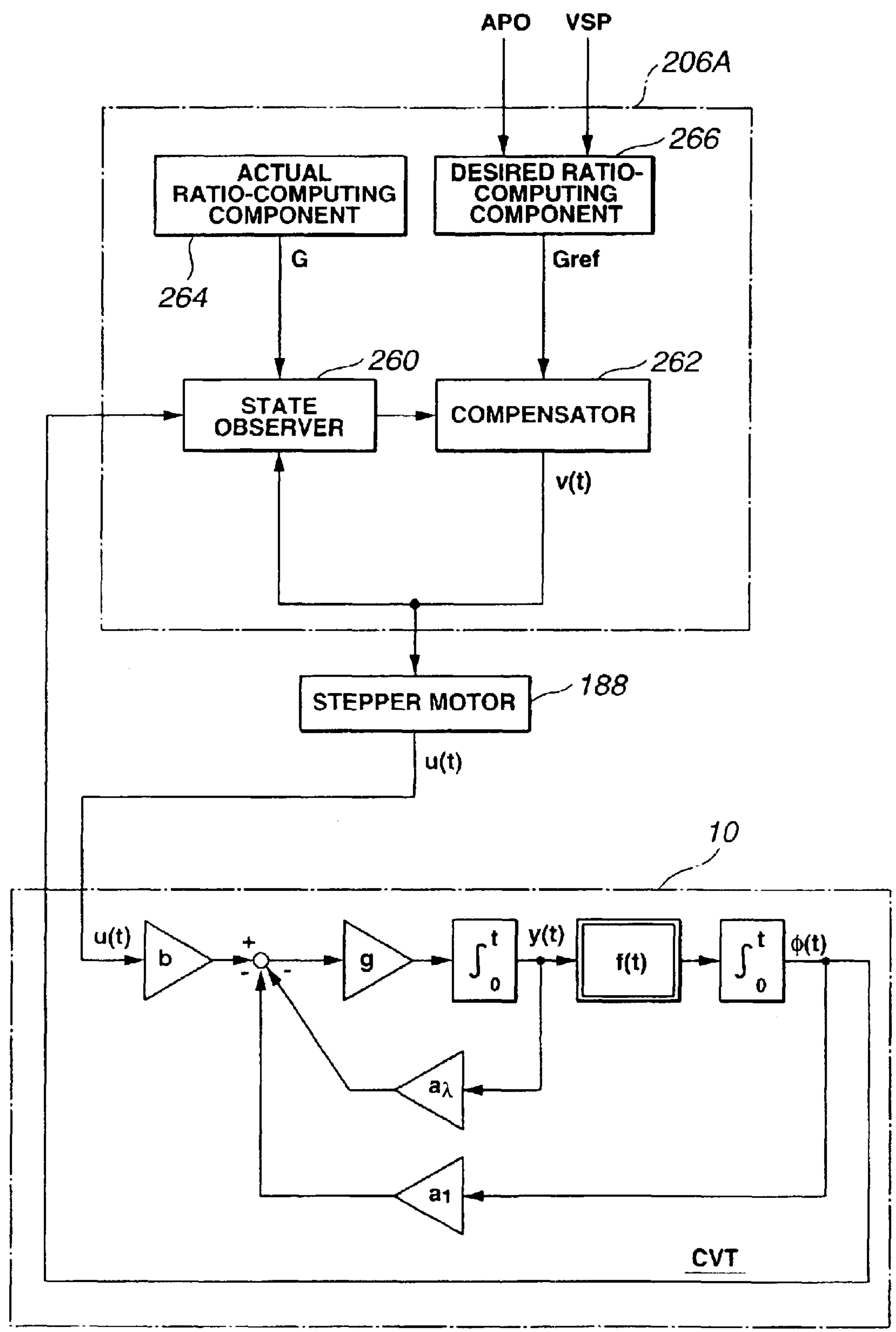
FIG. 14 is a block diagram showing the relationship between a CVT controller, a stepper motor and a toroidal-type CVT.
Figure 15:
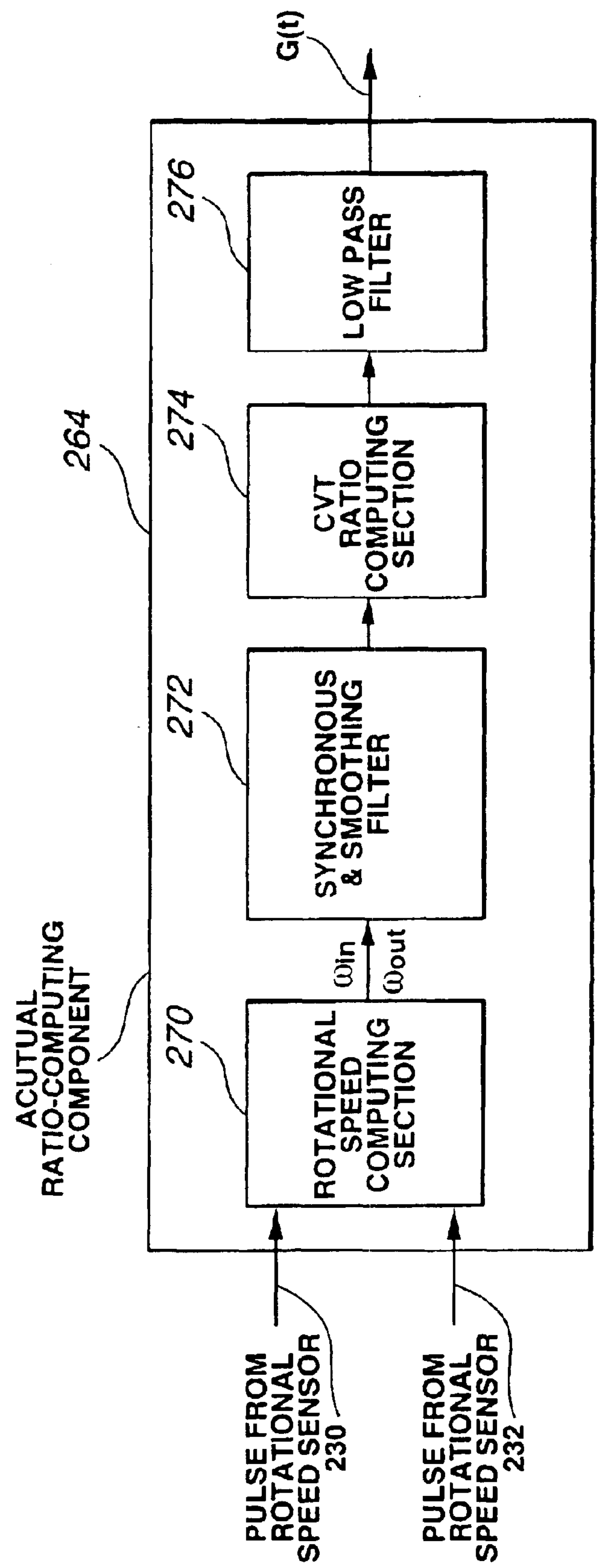
FIG. 15 is a control diagram of an actual ratio-computing component, which is common to the CVT controllers in FIGS. 3 and 14.

With reference mainly to FIGS. 14 to 15, another exemplary implementation of the present invention is described. As the hardware is common, reference is also made to FIGS. 1, 2, 4 and 5.

This implementation of the present invention is substantially the same as the previously described implementation.

As mentioned before in connection with the equation (1), substituting the CVT ratio G into the equation (1) yields the roller inclination angle $\phi$.

The SMD speed v and SMD position u hold the relationship as, $$u(t_k) = \int_{t_k-1}^{t_k} v(\tau)\,d\tau \quad (28)$$

where:

$t_k=kT_s$ ($T_s$ is the control period)

The equation (28) may be regarded as equivalence to the equation (2).

In a similar manner to the equation (3), varying of the inclination angle $\phi$ with different values of the SMD position u may be expressed as, $$\begin{cases} \frac{dx}{dt} = Ax + Bv \\ y = Cx \end{cases} \quad (29)$$

In the above equations, the notations A, B, C and x are:

$$A = \begin{bmatrix} 0 & f & 0 \\ -a_1 & -a_2 & bg \\ 0 & 0 & 0 \end{bmatrix}$$

$$B = \begin{bmatrix} 0 \\ 0 \\ 1 \end{bmatrix}$$

$$C = [1 \;\; 0 \;\; 0]$$

$$x = \begin{bmatrix} \phi \\ y \\ u \end{bmatrix}$$

where:

f is expressed as, $$f = \frac{\cos(\theta-\phi)[1+\eta-\cos(2\theta-\phi)]}{(1+\eta)R_0\sin\theta}\omega_{out} = h\omega_{out} \quad (30)$$

Using the relationship between the CVT ratio G and the roller inclination angle $\phi$ as expressed by the equation, it is possible to give an estimate of the roller inclination angle $\phi$ from the CVT ratio G. Here, we show a low rank model for estimating the trunnion axial displacement y and the SMD position u.

$$\begin{cases} \dot{w} = A_{22}w + B_2v + A_{21}\phi \\ w = \begin{bmatrix} y \\ u \end{bmatrix} \\ A = \begin{bmatrix} A_{11} & A_{12} \\ A_{21} & A_{22} \end{bmatrix}, A_{11}=0, A_{12}=[f \;\; 0], A_{21}=\begin{bmatrix} -a_1g \\ 0 \end{bmatrix}, A_{22}=\begin{bmatrix} -a_2g & bg \\ 0 & 0 \end{bmatrix} \\ B = \begin{bmatrix} B_1 \\ B_2 \end{bmatrix}, B_1=0, B_2=\begin{bmatrix} 0 \\ 1 \end{bmatrix} \end{cases} \quad (31)$$

CVT Ratio Controller

This implementation of the present invention is different from the previously described implementation in CVT ratio controller, As different from the CVT ratio controller 206, a CVT ratio controller, now generally designated at 206A, includes a state observer 260 and a compensator 262 in addition to an actual ratio-computing (ARC) component 264 and a desired ratio-computing (DRC) component 266 as shown in FIG. 14.

State Observer

With continuing reference to the block diagram in FIG. 14, the state observer 260 is explained. We now give an estimate $w_e$ of w. The estimate $w_e$ may be expressed as, $$\begin{cases} \dot{W}_e = A_{22}w_e + B_2 v + A_{21}\phi + H\left(\dot{\phi} - \dot{\hat{\phi}}\right) \\ W_e = \begin{bmatrix} \hat{y} \\ \hat{u} \end{bmatrix} \\ \dot{\phi} = A_{12}w,\ \dot{\hat{\phi}} = A_{12}w_e \\ H = \begin{bmatrix} h_1 \\ h_2 \end{bmatrix} \end{cases} \tag{32}$$

where:

$\hat{y}$ is the estimate of trunnion axial displacement y, $\hat{u}$ is the estimate of SMD position u, and $h_1$ and $h_2$ are observer gains.

The roller inclination rate (angular speed) dϕ, is used as an input to the observer 260 expressed by the above equation (32), but it is difficult to directly detect. Thus, a need arises for the state conversion as, $$\begin{cases} W_e = q + H\phi \\ q = \begin{bmatrix} q_1 \\ q_2 \end{bmatrix} \end{cases} \tag{33}$$

where:

q is the quasi-state estimate.

Differentiating the equation (33) and substituting the equation (32) into the equation as differentiated yield the equation as, $$\begin{cases} \dot{q} = A_{obs}q + D\phi + B_2 v \\ A_{obs} = A_{22} - HA_{12}\begin{bmatrix} -a_2 g - h_1 f & bg \\ -h_2 f & 0 \end{bmatrix} \\ D = A_{21} + A_{22}H - HA_{12}H - H \end{cases} \tag{34}$$

Since it is time dependent, f may be removed by setting the observer gains $h_1$ and $h_2$ as, $$\begin{cases} h_1 = \dfrac{-a_2 g - h_1}{f} \\ h_2 = \dfrac{-h_2}{f} \end{cases} \tag{35}$$

Accordingly, the observer $A_{obs}$ may be rewritten as, $$A_{obs} = \begin{bmatrix} h_1 & bg \\ h_2 & 0 \end{bmatrix} \tag{36}$$

From the preceding description on the observer 260, it is now readily seen that the observer 260 determines the quasi-state estimate q expressed by the equation (34) to yield the state estimate $w_e$.

Compensator

With continuing reference to FIG. 14, the compensator 262 is explained. The compensator 262 provides the SMD speed v, which may be expressed as, $$v(t) = -K\frac{\sigma}{|\sigma| + \sigma 0} \tag{37}$$

where:

K is the switching gain.

In the above equation, the effect, which the constant $\sigma_o$ may have, can be neglected by setting the switching gain K to a sufficiently large value.

σ is given by the following equation $$\sigma=\ddot{G}+2\zeta\omega G+\omega^2(G-G_{ref}) \tag{38}$$

where:

ξ is the damping coefficient,

ω is the natural frequency, $G_{ref}$ is the desired value of CVT ratio G.

The CVT ratio G, the first derivative of G, and the second derivative of G are given by $$\begin{aligned} G &= \frac{1+\eta-\cos(2\theta-\phi)}{1+\eta-\cos\phi} \\ G &= \frac{\sin(-2\theta+\phi)}{1+\eta-\cos\phi} - \frac{\{1+\eta-\cos(-2\theta+\phi)\}\sin\phi}{(1+\eta-\cos\phi)^2} \\ G &= \frac{\cos(-2\theta+\phi)}{1+\eta-\cos\phi} - 2\frac{\sin(-2\theta+\phi)\sin\phi}{(1+\eta-\cos\phi)^2} + 2\frac{\{1+\eta-\cos(-2\theta+\phi)\}(\sin\phi)^2}{(1+\eta-\cos\phi)^3} - \frac{\{1+\eta-\cos(-2\theta+\phi)\}\cos\phi}{(1+\eta-\cos\phi)^2} \end{aligned} \tag{39}$$

Using the equation (37), the compensator 262 determines the SMD speed v so as to track the desired value of CVT ratio $G_{ref}$. Driving the stepper motor 188 based on the SMD speed v causes ratio change.

ARC Component

With reference also to FIG. 15, the ARC component 264 is explained. A pulse train signal from the input rotational speed sensor 230 (see FIG. 5) is used as one input to the ARC component 264. A pulse train signal from the output rotational speed sensor 232 is used as another input to the ARC component 264. The ARC component 264 includes a rotational speed computing section 270, a synchronous & smoothing filter 272, a CVT ratio computing section 274 and a lowpass filter 276. The rotational speed computing section 270 computes rotational speed $\omega_{in}$ of input disc 42 and rotational speed $\omega_{out}$ of output disc 52 (see FIG. 5). The filter 272 synchronizes and smoothes the rotational speeds $\omega_{in}$ and $\omega_{out}$. Based on the synchronized and smoothed rotational speeds, the CVT ratio computing section 274 computes CVT ratio. The computed CVT ratio is used as input to the low pass filter 276. The low pass filter 276 smoothes the computed CVT ratio to provide smoothed CVT ratio.

Figure 16:
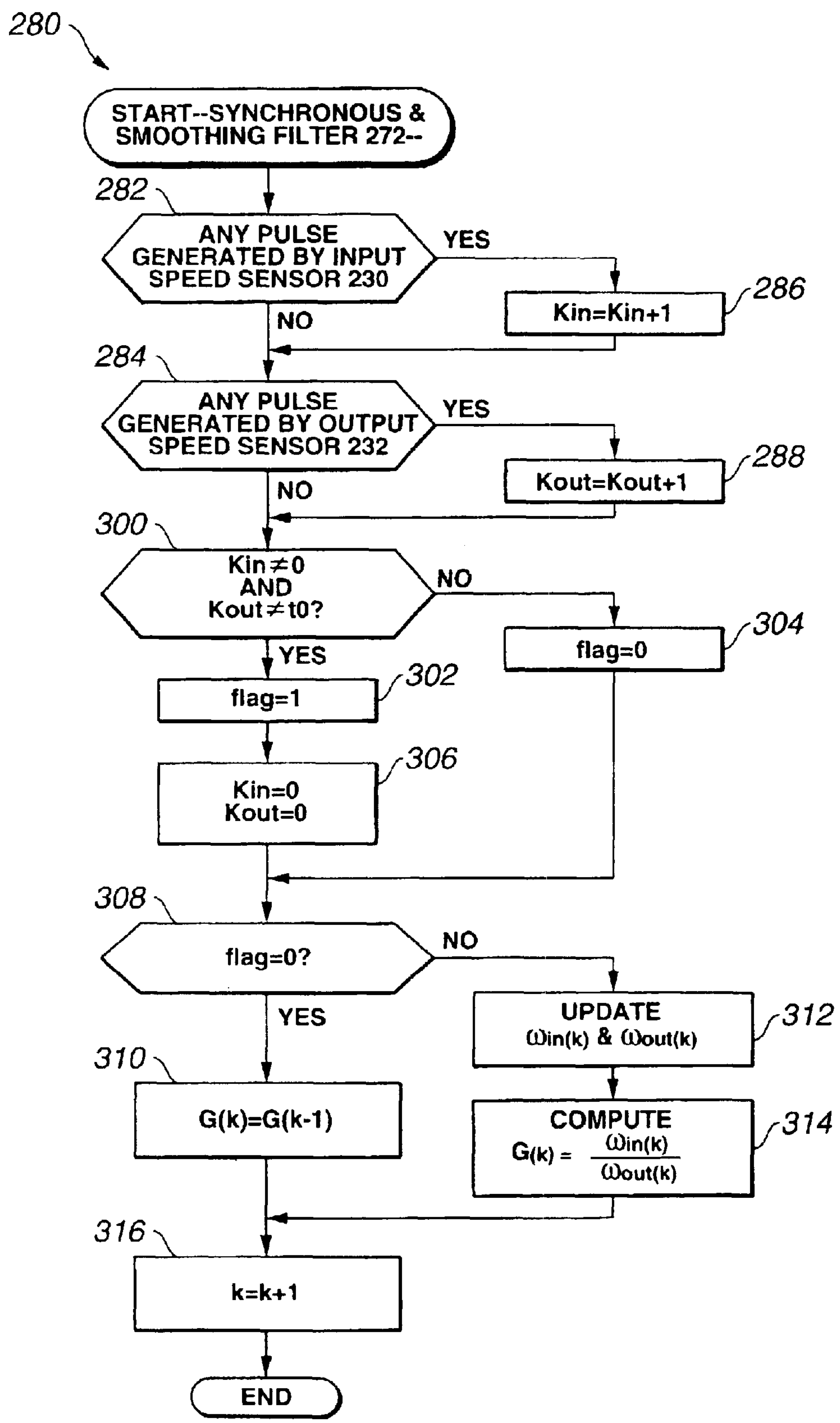
FIG. 16 is a flow diagram of a control routine implementing a synchronous & smoothing filter.

With reference to FIG. 16, the synchronous and smoothing filter 272 is explained. The flow diagram in FIG. 16 illustrates a control routine 280 for performing the synchronous and smoothing action of the filter 272. The execution of the control routine 280 is repeated at regular time interval.

In box 282, the CVT ratio controller 206A determines whether or not the input rotational speed sensor 230 generated a pulse during a period of the preceding interval. If this is the case, the logic goes to box 286. If this is not the case, the logic goes to box 284. The controller 206A determines the generation of a pulse by the occurrence of a rise at the leading edge of the pulse or a fall at the trailing edge of the pulse.

In box 286, the controller increases a counter Kin by one (Kin=Kin+1). After box 286, the logic goes to box 284.

In box 284, the controller determines whether or not the output rotational speed sensor 232 generated a pulse during the period of the preceding interval. If this is the case, the logic goes to box 288. If this is not the case, the logic goes to box 300.

In box 288, the controller increases another counter Kout by one (Kout=Kout+1). After box 288, the logic goes to box 300.

In box 300, the controller determines whether the counters Kin and Kout are not cleared (Kin≠0 and Kout≠0) or not. If this is the case, the logic goes to box 302. This is the case where each of the input and output rotational speed sensors 230 and 232 generated at least one pulse until the end of the preceding interval. If this is not the case, the logic goes to box 304.

In box 302, the controller sets an indicator flag (flag=1). After box 302, the logic goes to box 306.

In box 304, the controller resets the indicator flag (flag=0). After box 304, the logic goes to box 308.

In box 306, the controller clears the counters Kin and Kout (Kin=0 and Kout=0). After box 306, the logic goes to box 308.

In box 308, the controller determines whether or not the indicator flag is reset (flag=0). If this is the case, the logic goes to box 310. If this is not the case, the logic goes to box 312.

In box 310, the old values of input and output rotational speeds $\omega_{in}$(k−1) and $\omega_{out}$(k−1), which were set in the preceding control cycle the predetermined interval ago, are set as the present values of input and output rotational speeds $\omega_{in}$(k) and $\omega_{out}$(k), and the old value of CVT ratio G(k−1), which was computed in the preceding control cycle the predetermined interval ago, is set as the present value of CVT ratio G(k). This present value of CVT ratio G(k) is generated as output. After box 310, the logic goes to box 316.

In box 312, the controller updates the present values of input and output rotational speeds $\omega_{in}$(k) and $\omega_{out}$(k) with the latest values of input and output rotational speeds $\omega_{in}$ and $\omega_{out}$ that are provided by the rotational speed computing section 270. After box 312, the logic goes to box 314.

In box 314, the controller computes the present value of CVT ratio G(k) based on the data updated in box 312. G(k) is expressed as $G(k)=\omega_{in}(k)/\omega_{out}(k)$. After box 314, the logic goes to box 316.

In box 316, the controller increases a parameter k by one (k=k+1) before terminating the present control cycle.

With reference also to FIG. 5, the toothed wheels 234 and 236 don't turn at the same rotational speed. Besides, there are cases where the number of teeth of the wheel 234 is different from the number of teeth of the wheel 236. In the embodiment, the number of teeth of the wheel 234 is 12, and the number of teeth of the wheel 236 is 21.

Referring back to the flow diagram in FIG. 16, particular attention is paid to boxes 282, 286, 284 and 288. The relationship that the counter Kin is not cleared (Kin≠0) holds whenever the input rotational speed sensor 230 generated at least one pulse till the end of the preceding interval. Similarly, the relationship that the counter Kout is not cleared (Kout≠0) holds whenever the output rotational speed sensor 232 generated at least one pulse till the end of the preceding interval.

Next, attention is paid to the interrogation in boxes 300, 302 and 306. What this interrogation means is that the logic goes from box 300 to box 302 only when and if each of the input and output rotational speed sensors 230 and 232 generated at least one pulse till the end of the preceding interval. In box 302, the controller sets the indicator flag (flag=1), indicating the above event that took place till the end of the preceding interval. In box 306, the counters Kin and Kout are cleared immediately after the interrogation in box 300 has turned out to be affirmative.

Next, attention is paid to boxes 312 and 314 that follow box 308. In the case where flag=1, the logic goes to boxes 312 and 314 to update the present values of input and output rotational speeds $\omega_{in}$(k) and $\omega_{out}$(k) with the latest values of input and output rotational speeds $\omega_{in}$ and $\omega_{out}$ that are provided by the rotational speed computing section 270.

From the preceding description, it may be apparent to those skilled in the art that repeating execution of the control routine 280 makes the controller to recognize the longer one in period of pulse interval between one pulse train signal generated by the input rotational speed sensor 230 and another pulse train signal generated by the output rotational speed sensor 232. Thus, the controller functions to recognize the longer one in period of pulse interval between one pulse train signal generated by the input rotational speed sensor 230 and another pulse train signal generated by the output rotational speed sensor 232.

At rotational speed computing section 270, the rotational speed $\omega_{in}$ is updated at the timing of generation of a new pulse from the input rotational speed sensor 230, and the rotational speed $\omega_{out}$ is updated at the timing of generation of a new pulse generated by the output rotational speed sensor 232. Thus, the interval between the two consecutive timings of updating the rotational speed $\omega_{in}$ indicates the interval between the two consecutive pulses generated by the input rotational speed sensor 230. Similarly, the interval between the two consecutive timings of updating the rotational speed $\omega_{out}$ indicates the interval between the two consecutive pulses generated by the output rotational speed sensor 232.

At very low vehicle speeds, the interval between the updating timings caused due to pulses from the output rotational speed sensor 232 is considered to be longer than the interval between the updating timings caused due to pulses from the input rotational speed sensor 230. This relationship may be reversed if the number of teeth of the wheel 234 considerably exceeds the number of teeth of the wheel 236.

The present values of rotational speeds $\omega_{in}$(k) and $\omega_{out}$(k) are updated only when, till the end of the preceding interval, each of the input and output rotational speed sensors 230 and 232 generated at least one new pulse to cause the rotational speed computing section 270 to update the rotational speeds $\omega_{in}$ and $\omega_{out}$. Updating the present values of rotational speeds $\omega_{in}(k)$ and $\omega_{out}(k)$ may be regarded as updating them in synchronous with the timings of generation of pulses of one of two trains of pulses, whose pulse interval is longer than the other.

Figure 17A:
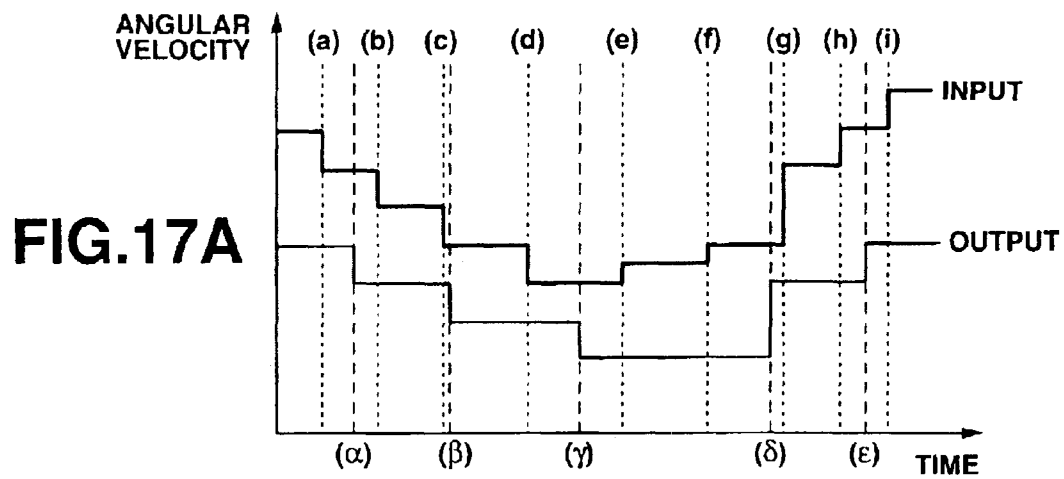
FIGS. 17A, 17B and 17C are timing diagrams illustrating how the rotational speeds of input and output discs are synchronized with each other.
Figure 17B:
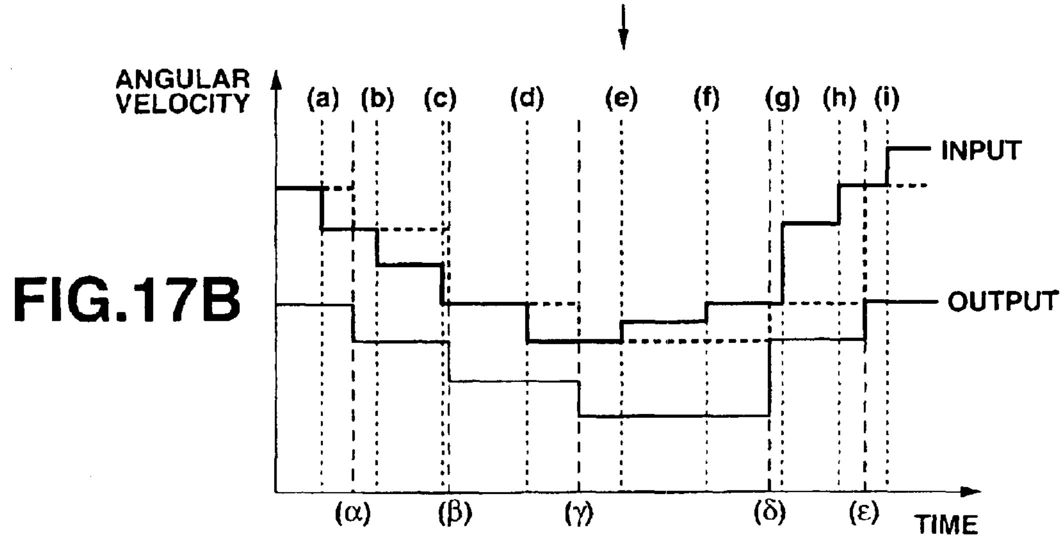
Figure 17C:
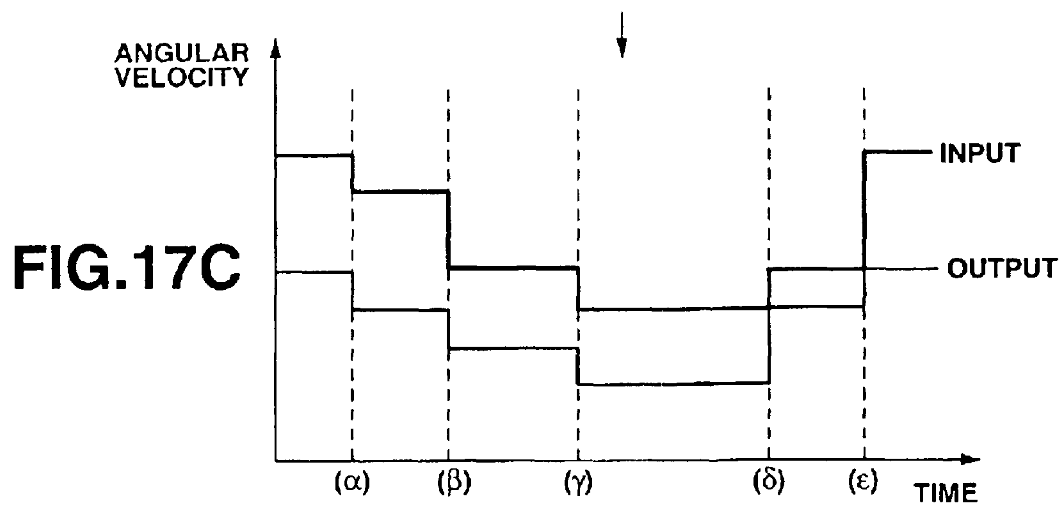

The timing diagrams in FIGS. 17A, 17B and 17C illustrate how the rotational speed $\omega_{in}$ of input disc 42 is synchronized with the rotational speed $\omega_{out}$ of output disc 52 at very low vehicle speeds. As shown in FIG. 17A, the rotational speed $\omega_{in}$ is updated by pulses generated by the input rotational speed sensor 230 at timings (a), (b), (c) . . . (h) and (i), and the rotational speed $\omega_{out}$ is updated by pulses generated by the output rotational speed sensor 232 at timings (α), (β), (γ), (δ) and (ε). In each of FIGS. 17A, 17B and 17C, the vertical axis represents angular velocity, and the horizontal axis represents time.

FIG. 17B is substantially the same as FIG. 17A but the provision of an extension line drawn by dots. The illustrated extension line indicates the control strategy explained in the flow diagram in FIG. 16. For example, an updating event that took place at the moment (a) is not reflected in the present value $\omega_{in}(k)$ until the present value $\omega_{in}(k)$ is updated at the moment (α). An updating event that took place at the moment (b) is not reflected in the present value $\omega_{in}(k)$ until the present value $\omega_{in}(k)$ is updated at the moment (β). An updating event that took place at the moment (d) is not reflected in the present value $\omega_{in}(k)$ until the present value $\omega_{in}(k)$ is updated at the moment (γ). The two consecutive updating events that took place at the moments (e) and (f) are not reflected in the present value $\omega_{in}(k)$ until the present value $\omega_{in}(k)$ is updated at the moment (δ). The two consecutive updating events that took place at the moments (g) and (h) are not reflected in the present value $\omega_{in}(k)$ until the present value $\omega_{in}(k)$ is updated at the moment (ε).

The fully drawn lines in FIG. 17C illustrate varying of the present value $\omega_{in}(k)$ of rotational speed of input disc 42 in synchronous with the present value $\omega_{out}(k)$ of rotational speed of output disc 52.

Figure 18:
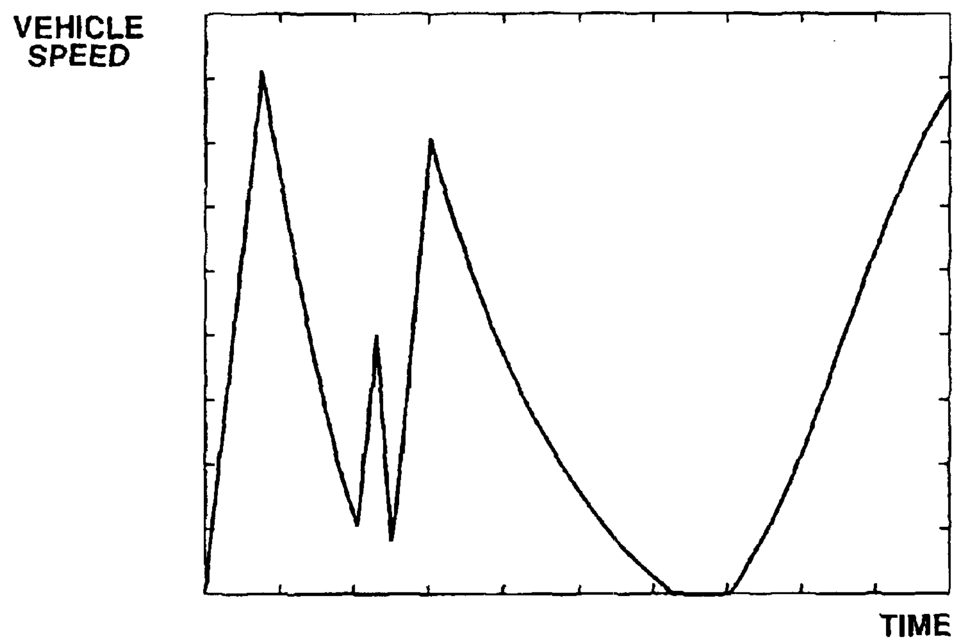
FIG. 18 is a graph similar view to FIG. 10, illustrating varying of vehicle speed with time during simulation at low vehicle speeds.

A test was conducted at vehicle speeds lower than 4 km/h. The fully drawn line in FIG. 18 illustrates varying of vehicle speed with time. The fully drawn lines in FIG. 19 illustrate varying of rotational speed $\omega_{in}$ of input disc 42 with time and varying of rotational speed $\omega_{out}$ of output disc 52 with time.

Figure 19:
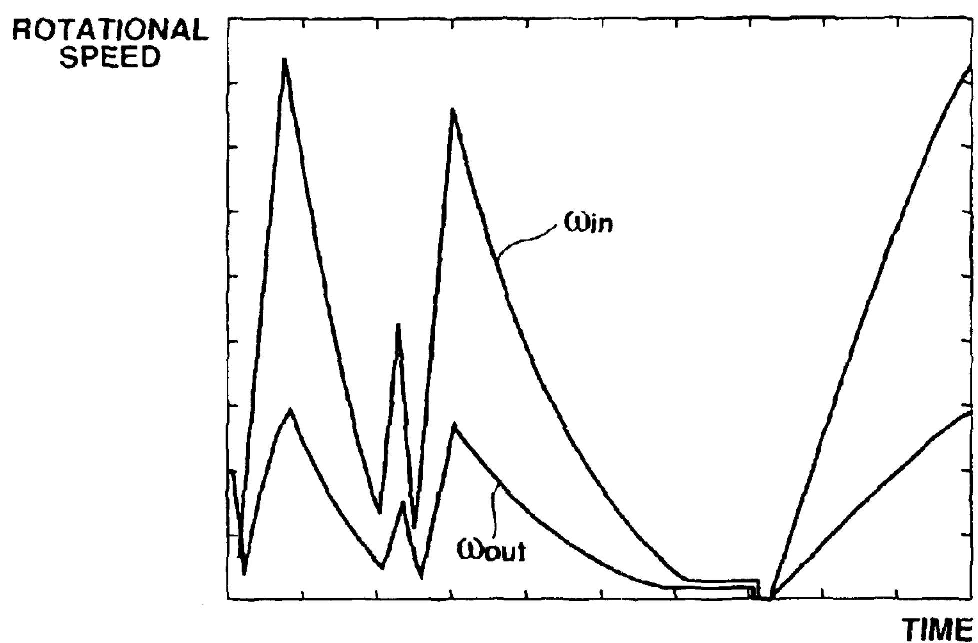
FIG. 19 is a graph illustrating varying of rotational speed of input disc with time and varying of rotational speed of output disc with time during the simulation.
Figure 20A:
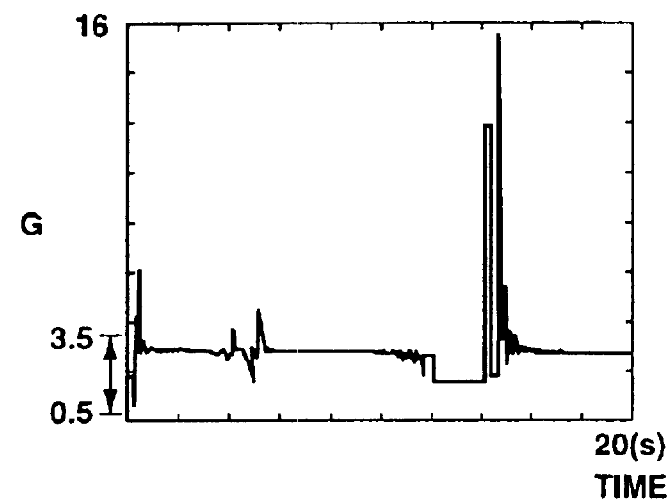
FIG. 20A is a timing diagram illustrating varying of values of CVT ratio computed based on the result illustrated in FIG. 19.
Figure 20B:
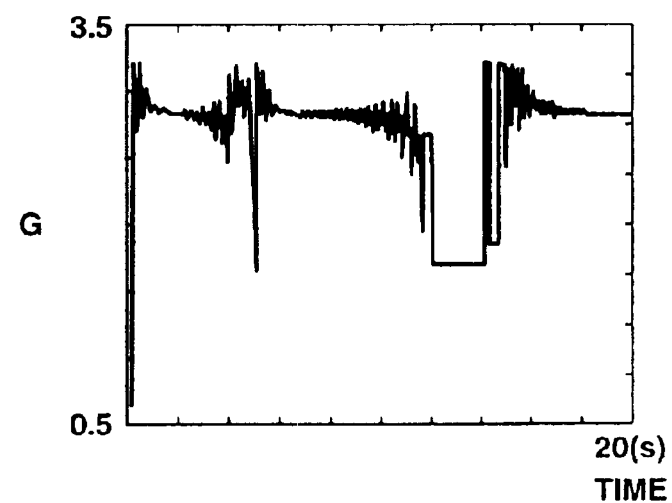
FIG. 20B is a timing diagram illustrating the computed values of CVT ratio remaining in a practical range of CVT ratio after cutting off the computed values of CVT ratio that stay outside of the practical range.
Figure 20C:
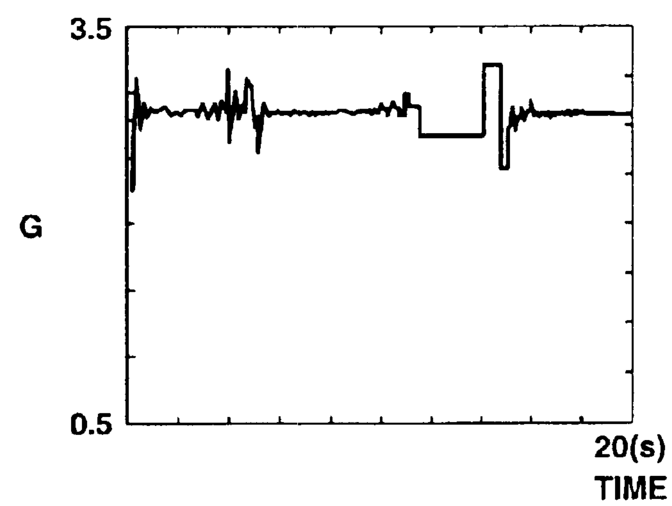
FIG. 20C is a timing diagram illustrating values of CVT ratio computed after processing the result illustrated in FIG. 19 by the synchronous & smoothing filter.

The timing diagram in FIG. 20A illustrates values of CVT ratio G computed based on the result illustrated in FIG. 19. In FIG. 20A, a double-headed arrow indicates a practical range of CVT ratio from 0.5 to 3.5. The timing diagram in FIG. 20B is a portion of FIG. 20A, illustrating the computed values of CVT ratio remaining in the practical range of CVT ratio after cutting off the computed values of CVT ratio that stay outside of this practical range. FIG. 20C is the same graph as FIG. 20B. However, the timing diagram in FIG. 20C is different from that in FIG. 20B.

The timing diagram in FIG. 20C illustrates values of CVT ratio computed after processing the result illustrated in FIG. 19 by the synchronous & smoothing filter 272.

Comparing FIG. 20C to FIG. 20B clearly reveals how much the synchronous & smoothing filter 272 has effect on stabilizing the computed values of CVT ratio G. Clearly, the computed values of CVT ratio in FIG. 20C are more stable than those in FIG. 20B.

The timing diagram in FIG. 20B shows undesired variation in the computed values of CVT ratio. To remove such undesired vibration, the conventional technique requires a low pass filter with low cutoff frequency. Adjustment of the cutoff frequency is a compromise between effectiveness of the low pass filter and order thereof. For effective filtering, an elevation in the order is required. However, such elevation results in an increase in burden upon arithmetic operation. A high order low pass filter with low cutoff frequency poses two problems. One problem is increased burden upon arithmetic operation. The other problem is increased delay.

With reference back to FIG. 15, the synchronous & smoothing filter 272 synchronizes two trains of pulses from the rotational speed sensors 230 and 232 before filtering by the low pass filter 276. In this case, the low pass filter 276 no longer requires a high order low pass filter. Thus, the low pass filter 276 is free from the above-mentioned two problems.

In the implementation of the present invention, the low pass filter 276 selects one out of three filters, namely filter 1, filter 2 and filter 3, in response to rotational speed $\omega_{out}$ of output disc 52. Butter-worth filter is used as each of these three filters.

Assuming now that $\omega_{out}(\max)$ indicates the maximum rotational speed of a range covered by the synchronous & smoothing filter 272, the range $(0 \leftrightarrow \omega_{out}(\max))$ is divided by three reference values $\omega_{out}(\min)$, $\omega_{out}(\text{mid}1)$ and $\omega_{out}(\text{mid}2)$ into four sections. The relationship is that $0<\omega_{out}(\min)<\omega_{out}(\text{mid}1)<\omega_{out}(\text{mid}2)<\omega_{out}(\max)$.

The filters 1, 2 and 3 may be expressed as $$\begin{cases} \text{Filter 1} & \dfrac{\beta_1(z+1)}{z-\alpha_1} \\ \text{Filter 2} & \dfrac{\beta_2(z+1)}{z-\alpha_2} \\ \text{Filter 3} & \dfrac{\beta_3(z+1)}{z-\alpha_3} \end{cases} \tag{40}$$

where:

$\alpha_n$ and $\beta_n$ (n=1, 2, 3) are determined in response to a time constant set at each of the filters 1, 2 and 3, $\alpha_1<\alpha_2<\alpha_3$, $\beta_1>\beta_2>\beta_3$ The filtering performance of each of the filters 1, 2 and 3 are described later in connection with FIGS. 21A, 21B and 21C.

The logic of selecting is as follows:

If $\omega_{out}(\text{mid}2) \leqq \omega_{out} < \omega_{out}(\max)$, then filter 1 is selected.

If $\omega_{out}(\text{mid}1) \leqq \omega_{out} < \omega_{out}(\text{mid}2)$, then filter 2 is selected.

If $\omega_{out}(\min) \leqq \omega_{out} < \omega_{out}(\text{mid}1)$, then filter 3 is selected.

Figure 21A:
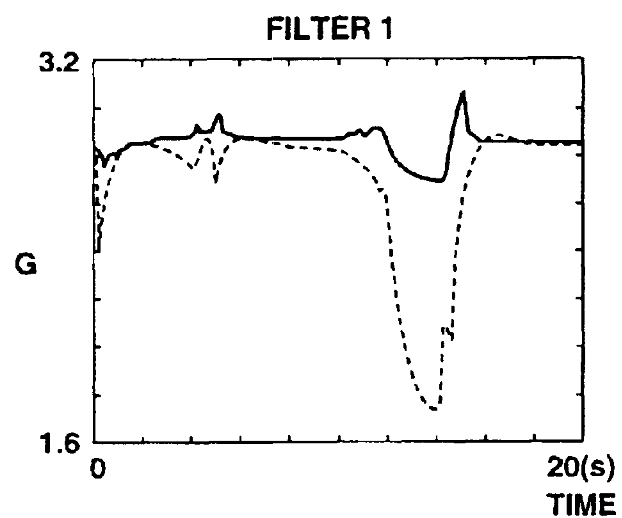
FIGS. 21A, 21B and 21C are timing diagrams illustrating performance of each of three different filters 1, 2 and 3, which make a rotational speed dependent low pass filter.

The fully drawn line in FIG. 21A illustrates the result from filtering by the filter 1 after processing by the synchronous & smoothing filter 272. The broken line in FIG. 21A illustrates the result from filtering by the filter 1 without processing by the synchronous & smoothing filter 272.

Figure 21B:
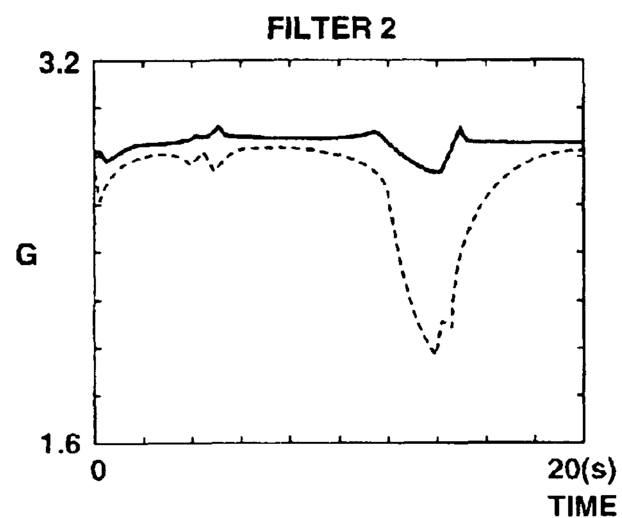

The fully drawn line in FIG. 21B illustrates the result from filtering by the filter 2 after processing by the synchronous & smoothing filter 272. The broken line in FIG. 21B illustrates the result from filtering by the filter 2 without processing by the synchronous & smoothing filter 272.

Figure 21C:
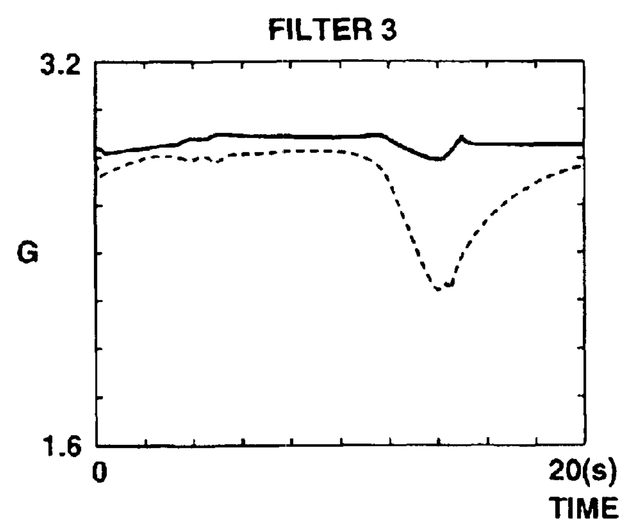

The fully drawn line in FIG. 21C illustrates the result from filtering by the filter 3 after processing by the synchronous & smoothing filter 272. The broken line in FIG. 21C illustrates the result from filtering by the filter 3 without processing by the synchronous & smoothing filter 272.

Among these three filters, the filter 3 has the largest value in time constant, thus providing considerable delay. With the filter 3, the smoothest variation in CVT ratio is accomplished. Thus, the filter 3 exhibits its effectiveness when the rotational speed $\omega_{out}$ is very low at low vehicle speeds. As vehicle speed exceeds a certain value, rapid variations in computed values in CVT ratio G disappears, the filter 3 is no longer necessary. Instead, the filter 2 and then filter 1, which have smaller values in tome constant, are used selectively to shorten or avoid the delay. Appropriately using the three filters 3, 2 and 1 in response to change in rotational speed $\omega_{out}$ provides the optimum filtering expected.

The low pass filter 276 may be in the form of an event-driven filter that updates time constant at low vehicle speeds only. With reference to the flow diagram in FIG. 16, according to the event-driven filter, the time constant is updated when the indicator flag is set (flag=1) with the result of calculation of $$\frac{q+a}{b(q+1)} \tag{41}$$

where:

a and b are the constants, q is the variable with the value of k (see box 316 in FIG. 16).

The value of the time constant is maintained when the indicator flag is reset (flag=0).

With the event-driven filter, the time constant of the filter becomes variable with the period of pulses of the synchronized trains of pulses (see FIG. 17C) and meets values expected at low vehicle speeds. More specifically, the time constant should be long when the period of pulses is long, while the time constant should be short when the period of pulses is short.

From the preceding description, it will be appreciated that the exemplary implementations of the present invention extend operating range of feedback in CVT ratio control toward very low vehicle speed ranges.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2002-109163, filed Apr. 11, 2002, and No. P2002-229593, filed Aug. 7, 2002, the disclosure of each of which is hereby incorporated by reference in its entirety.

What is claimed is:

1. A method of deriving an actual value of a ratio between rotational speed of an input member of a continuously variable transmission (CVT) and rotational speed of an output member of the CVT from a first pulse train signal and a second pulse train signal, the first pulse train signal being provided by an input speed sensor of an input speed sensor system including one rotating wheel with the input member, the second pulse train signal being provided by an output speed sensor of an output speed sensor system including another rotating wheel with the output member, the method comprising:

repeating updating of an old value of rotational speed of the input member to a new value thereof, which results from computation using the pulses of the first pulse train signal, at intervals governed by the first pulse train;

repeating updating of an old value of rotational speed of the output member to a new value thereof, which results from computation using the pulses of the second pulse train, at intervals governed by the second pulse train; and repeating updating of an old value of a ratio between the latest value of the rotational speed of the input member and the latest value of the rotational speed of the output member to a new value thereof each time immediately after the values of the rotational speeds of the input and output members have been updated since the latest updating of an old value of the ratio.

2. The method as claimed in claim 1, further comprising:

smoothing the new values of the ratio to yield the actual value of the ratio between rotational speed of the input member of the CVT and rotational speed of the output member of the CVT.

3. The method as claimed in claim 2, wherein the smoothing the new values of the ratio includes low pass filtering with cutoff frequency that becomes low with decreasing of the rotational speed of the output member.

4. A method of extending operating range of feedback in ratio control in a continuously variable transmission (CVT) for a motor vehicle, comprising:

providing a first pulse train signal by an input speed sensor of an input speed sensor system including one rotating wheel with a rotating input member of the CVT;

providing a second pulse train signal by an output speed sensor of an output speed sensor system including another rotating wheel with a rotating output member of the CVT;

repeating updating of an old value of rotational speed of the input member to a new value thereof, which results from computation using the pulses of the first pulse train signal, at intervals governed by the first pulse train;

repeating updating of an old value of rotational speed of the output member to a new value thereof, which results from computation using the pulses of the second pulse train, at intervals governed by the second pulse train;

repeating updating of an old value of a ratio between the latest value of the rotational speed of the input member and the latest value of the rotational speed of the output member to a new value thereof each time immediately after the values of the rotational speeds of the input and output members have been updated since the latest updating of an old value of the ratio; and using the new values of the ratio as an actual value of ratio between rotational speed of the input member of the CVT and rotational speed of the output member of the CVT in conducting a feedback in ratio control in the CVT during a predetermined operational range of the CVT.

5. The method as claimed in claim 4, wherein the longer one of period between the adjacent two pulses of the first pulse train and period between the adjacent two pulses of the second pulse train determines the moment of the updating of an old value of a ratio between the latest value of the rotational speed of the input member and the latest value of the rotational speed of the output member to a new value thereof.

6. The method as claimed in claim 4, wherein the predetermined operational range of the CVT is when vehicle speed of the motor vehicle is lower than a reference vehicle speed.

7. The method as claimed in claim 6, further comprising:

repeating updating of an old value of the ratio between the latest value of the rotational speed of the input member and the latest value of the rotational speed of the output member to a new value thereof at regular interval when the vehicle speed of the motor vehicle is not lower than the reference vehicle speed for use in conducting second feedback in ratio control in the CVT.

8. The method as claimed in claim 7, wherein the reference vehicle speed takes one of a first value and a second value depending on whether the vehicle speed is increasing or decreasing.

9. The method as claimed in claim 4, wherein the feedback conducted in ratio control is of the proportional integral (PI) type.

10. The method as claimed in claim 8, wherein the first-mentioned feedback is of the proportional integral (PI) type, and the second feedback is of the proportional integral differential (PID) type.

11. The method as claimed in claim 4, further comprising:

applying a low pass filter to smooth the new values of the ratio.

12. The method as claimed in claim 11, wherein the low pass filter has various cutoff frequencies with different values of rotational speed the output member of the CVT.

13. The method as claimed in claim 6, further comprising:

applying a low pass filter to smooth the new values of the ratio during the predetermined operational range of the CVT, the low pass filter having decreasing cutoff frequencies with decreasing values of rotational speed of the output member of the CVT.

14. A system for extending operating range of feedback in ratio control in a continuously variable transmission (CVT) for a motor vehicle, the CVT including a rotating input member and a rotating output member, the system comprising:

an input speed sensor system including one rotating wheel with the rotating input member of the CVT and an input speed sensor providing a first pulse train signal;

an output speed sensor system including another rotating wheel with the rotating output member of the CVT and an output speed sensor providing a second pulse train signal;

an actual ratio-computing (ARC) component, the ARC component including a rotational speed computing section, a synchronous & smoothing filter and CVT ratio computing section, the rotational speed computing section being operable to repeat updating of an old value of rotational speed of the input member to a new value thereof, which results from computation using the pulses of the first pulse train signal, at intervals governed by the first pulse train, the rotational speed computing section being operable to repeat updating of an old value of rotational speed of the output member to a new value thereof, which results from computation using the pulses of the second pulse train, at intervals governed by the second pulse train, the synchronous & smoothing filter and CVT ratio computing section being operable to repeat updating of an old value of a ratio between the latest value of the rotational speed of the input member and the latest value of the rotational speed of the output member to a new value thereof each time immediately after the values of the rotational speeds of the input and output members have been updated since the latest updating of an old value of the ratio, the ARC component being operable to use the new values of the ratio as an actual value of ratio between rotational speed of the input member of the CVT and rotational speed of the output member of the CVT;

a desired ratio-computing (DRC) component operable to provide a desired value of ratio between rotational speed of the input member of the CVT and rotational speed of the output member of the CVT; and a controller conducting feedback control in ratio control of the CVT based on the actual value of ratio between rotational speed of the input member of the CVT and rotational speed of the output member of the CVT and the desired value thereof during a predetermined operational range of the CVT.

15. The system as claimed in claim 14, wherein the ARC component further includes:

a low pass filter having cutoff frequencies variable with the different values of rotational speed of the output member of the CVT.

16. The system as claimed in claim 14, wherein the feedback is of the proportional integral (PI) type.

17. A system for deriving an actual value of a ratio between rotational speed of an input member of a continuously variable transmission (CVT) and rotational speed of an output member of the CVT from a first pulse train signal and a second pulse train signal, the first pulse train signal being provided by an input speed sensor of an input speed sensor system including one rotating wheel with the input member, the second pulse train signal being provided by an output speed sensor of an output speed sensor system including another rotating wheel with the output member, the system comprising:

means for repeating updating of an old value of rotational speed of the input member to a new value thereof, which results from computation using the pulses of the first pulse train signal, at intervals governed by the first pulse train;

means for repeating updating of an old value of rotational speed of the output member to a new value thereof, which results from computation using the pulses of the second pulse train, at intervals governed by the second pulse train; and means for repeating updating of an old value of a ratio between the latest value of the rotational speed of the input member and the latest value of the rotational speed of the output member to a new value thereof each time immediately after the values of the rotational speeds of the input and output members have been updated since the latest updating of an old value of the ratio.

* * * * *